United States Patent
Ishikawa

(10) Patent No.: US 7,677,222 B2
(45) Date of Patent: Mar. 16, 2010

(54) DIESEL ENGINE CONTROL DEVICE

(75) Inventor: Naoya Ishikawa, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 191 days.

(21) Appl. No.: 11/664,648

(22) PCT Filed: Oct. 4, 2005

(86) PCT No.: PCT/JP2005/018316

§ 371 (c)(1),
(2), (4) Date: Apr. 4, 2007

(87) PCT Pub. No.: WO2006/038601

PCT Pub. Date: Apr. 13, 2006

(65) Prior Publication Data

US 2009/0070002 A1    Mar. 12, 2009

(30) Foreign Application Priority Data

Oct. 6, 2004    (JP)    ............................... 2004-293965

(51) Int. Cl.
*F02D 41/30* (2006.01)
*F02B 3/12* (2006.01)
(52) U.S. Cl. ..................................... 123/299; 123/492
(58) Field of Classification Search ................. 123/295, 123/305, 568.11, 435, 436, 492, 299; 701/103–105, 701/108, 110
See application file for complete search history.

(56) References Cited

U.S. PATENT DOCUMENTS

| | | | | |
|---|---|---|---|---|
| 6,725,829 B2 | 4/2004 | Kataoka et al. | ............. | 123/299 |
| 6,976,469 B2 * | 12/2005 | Kubo et al. | ................. | 123/295 |
| 6,994,077 B2 * | 2/2006 | Kobayashi et al. | ..... | 123/568.11 |
| 7,146,964 B2 * | 12/2006 | Norimoto et al. | ........... | 123/435 |
| 7,367,290 B2 * | 5/2008 | Chen et al. | ................. | 123/27 R |
| 2003/0140629 A1 | 7/2003 | Shirakawa | .................... | 60/600 |
| 2003/0217732 A1 | 11/2003 | Kataoka et al. | ............. | 123/276 |
| 2004/0154582 A1 | 8/2004 | Shimazaki | .................. | 123/299 |
| 2009/0024305 A1 * | 1/2009 | Ishikawa | ..................... | 701/103 |

(Continued)

FOREIGN PATENT DOCUMENTS

EP    0952323 A2    10/1999

(Continued)

OTHER PUBLICATIONS

Search Report for PCT/JP2005/018316 dated Nov. 25, 2005.

(Continued)

*Primary Examiner*—Hai H Huynh
(74) *Attorney, Agent, or Firm*—McCormick, Paulding & Huber LLP

(57) ABSTRACT

In a diesel engine control device, a normal injection mode that implements normal combustion and a premixed injection mode that implements premixed combustion are set, the normal injection mode is implemented when the actual engine operating conditions are in the normal region, and the premixed injection mode is implemented when the actual engine operating conditions are in the premixed region. When one control mode is being implemented in the corresponding engine operating region, the control mode is forcibly switched to the other control mode when the engine enters a predetermined transition state. This makes it possible to switch earlier than normal, and in particular when accelerating, the desired acceleration performance can be obtained.

15 Claims, 14 Drawing Sheets

U.S. PATENT DOCUMENTS

2009/0118978 A1 * 5/2009 Tanabe et al. ............... 701/103

FOREIGN PATENT DOCUMENTS

| EP | 1221544 | A2 | 7/2002 |
| --- | --- | --- | --- |
| EP | 1316703 | A2 | 6/2003 |
| EP | 1348854 | A1 | 10/2003 |
| EP | 1348857 | A2 | 10/2003 |
| JP | 2000-145507 | | 5/2000 |
| JP | 2002-206448 | | 7/2002 |
| JP | 2002-327638 | | 11/2002 |
| JP | 2003-286879 | | 10/2003 |
| JP | 2004-003415 | | 1/2004 |
| JP | 2004-239208 | | 8/2004 |

OTHER PUBLICATIONS

Copy of Supplementary Search Report for European Patent Application No. 05790498.9 dated Dec. 8, 2008.

* cited by examiner

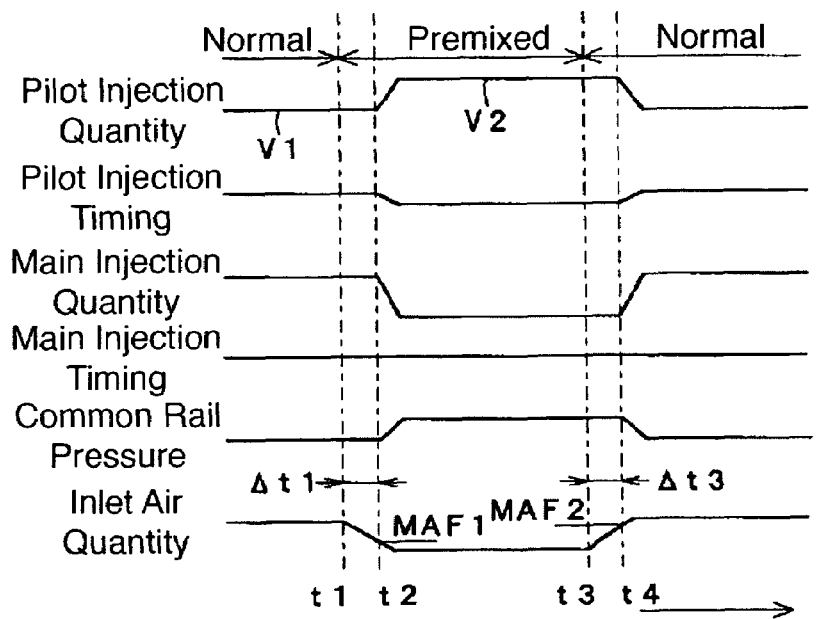
FIG. 7
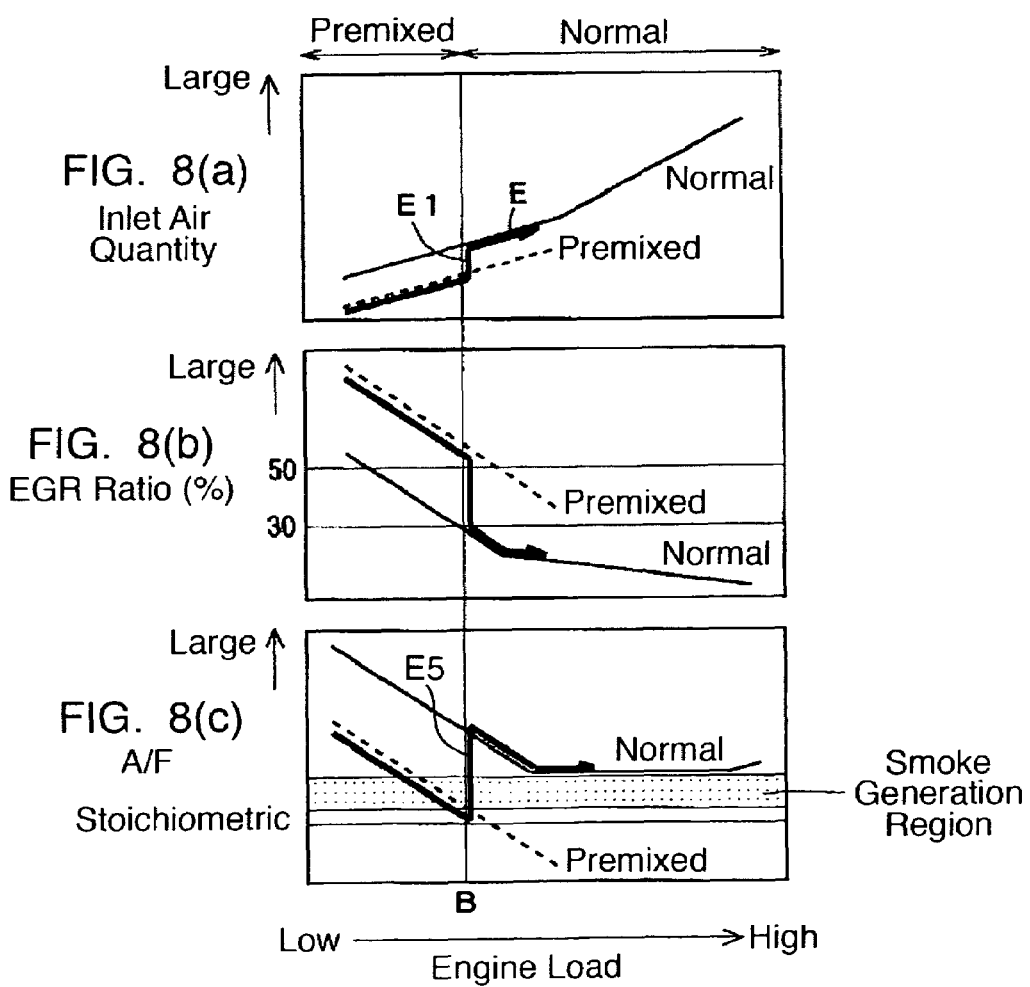
FIG. 8(a) Inlet Air Quantity
FIG. 8(b) EGR Ratio (%)
FIG. 8(c) A/F

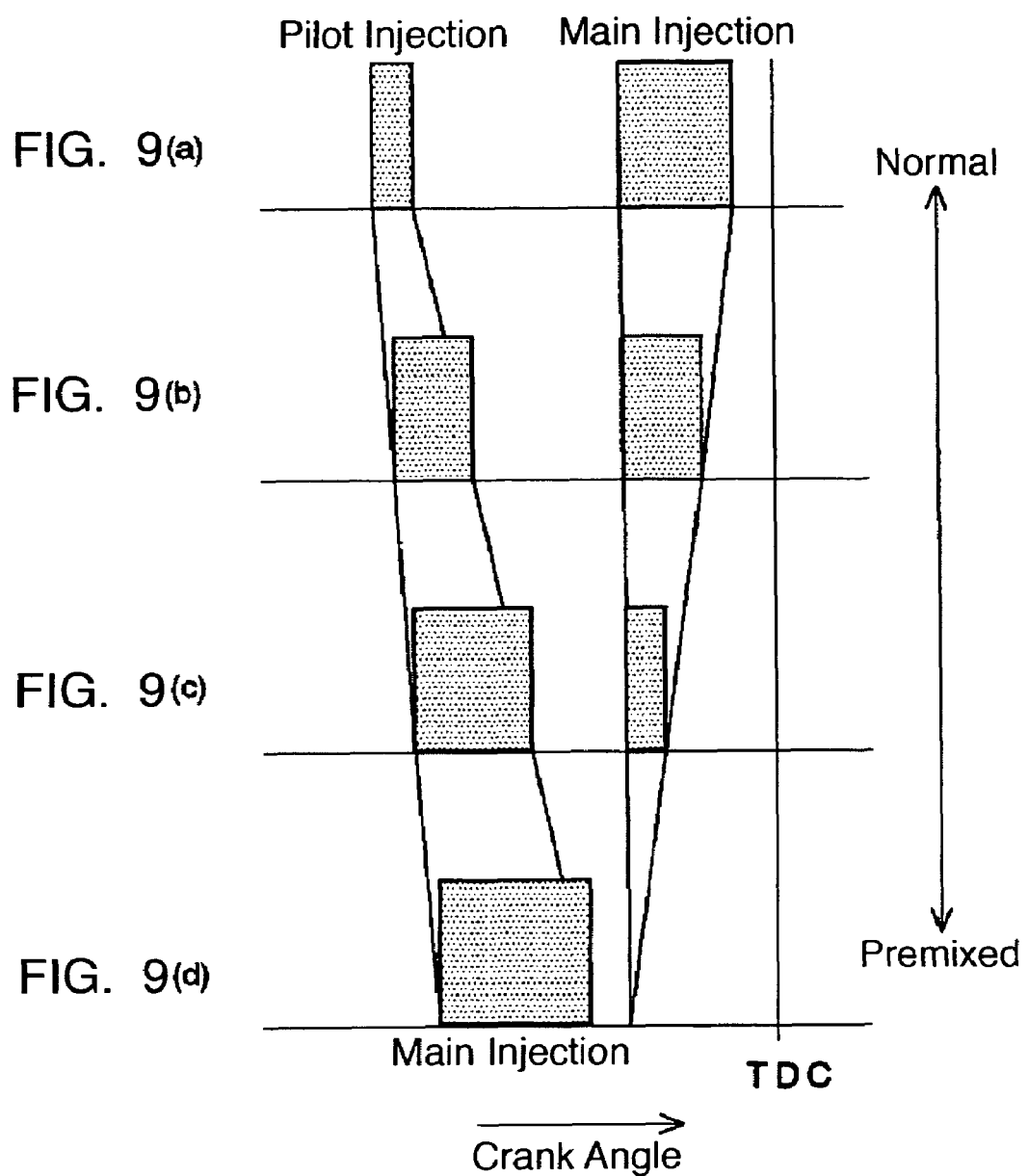

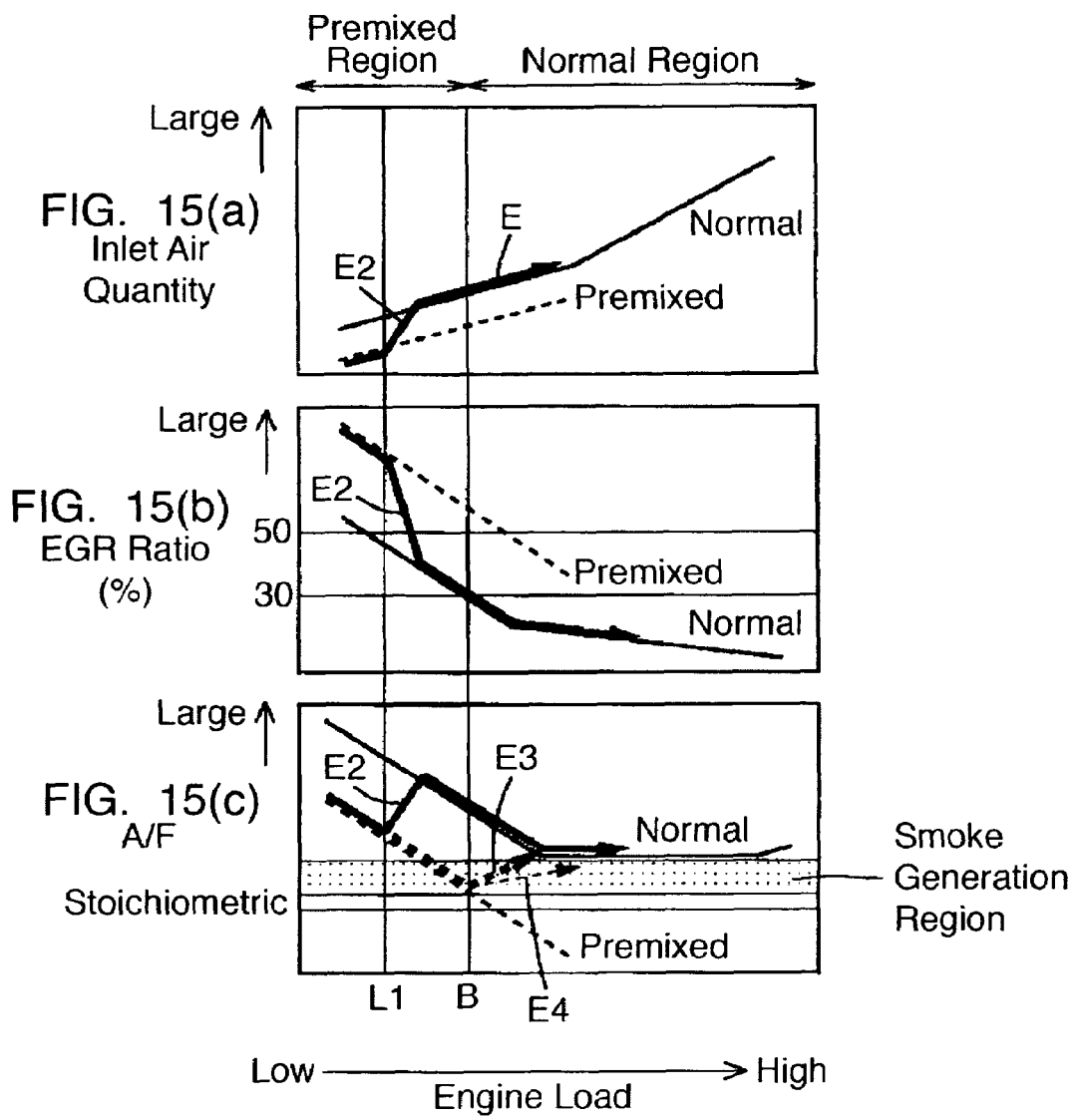

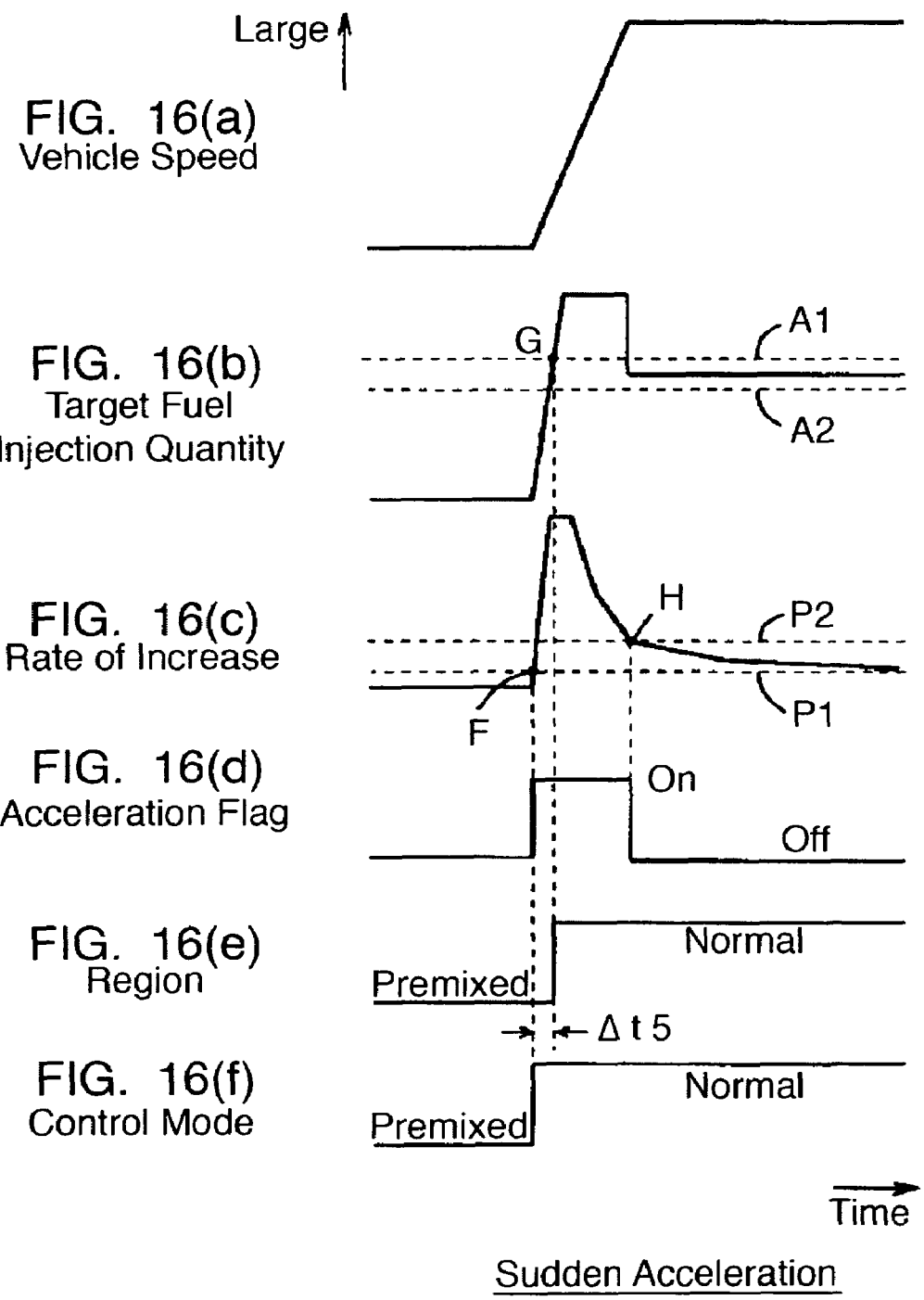
FIG. 16(a) Vehicle Speed
FIG. 16(b) Target Fuel Injection Quantity
FIG. 16(c) Rate of Increase
FIG. 16(d) Acceleration Flag
FIG. 16(e) Region
FIG. 16(f) Control Mode
Sudden Acceleration

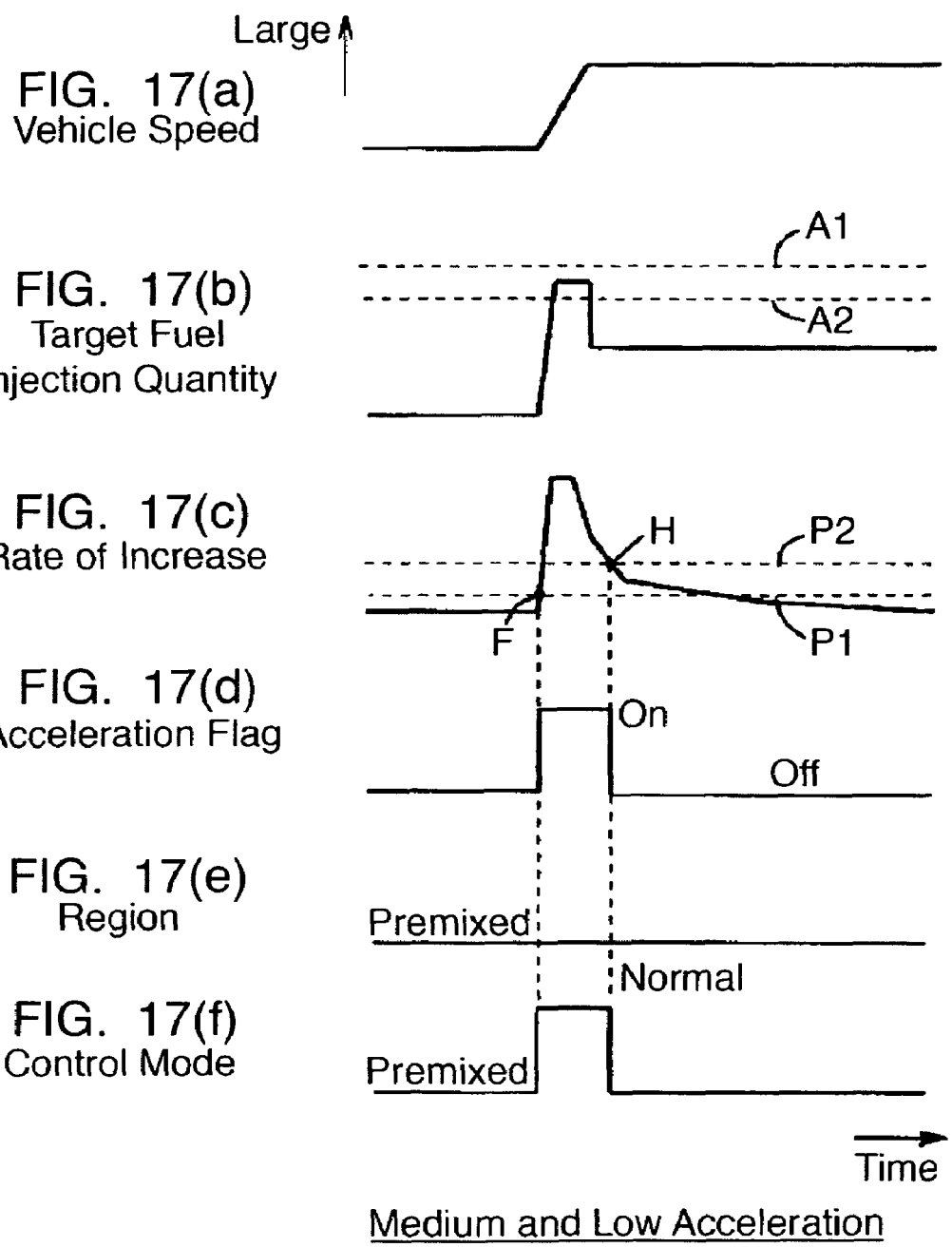
Medium and Low Acceleration

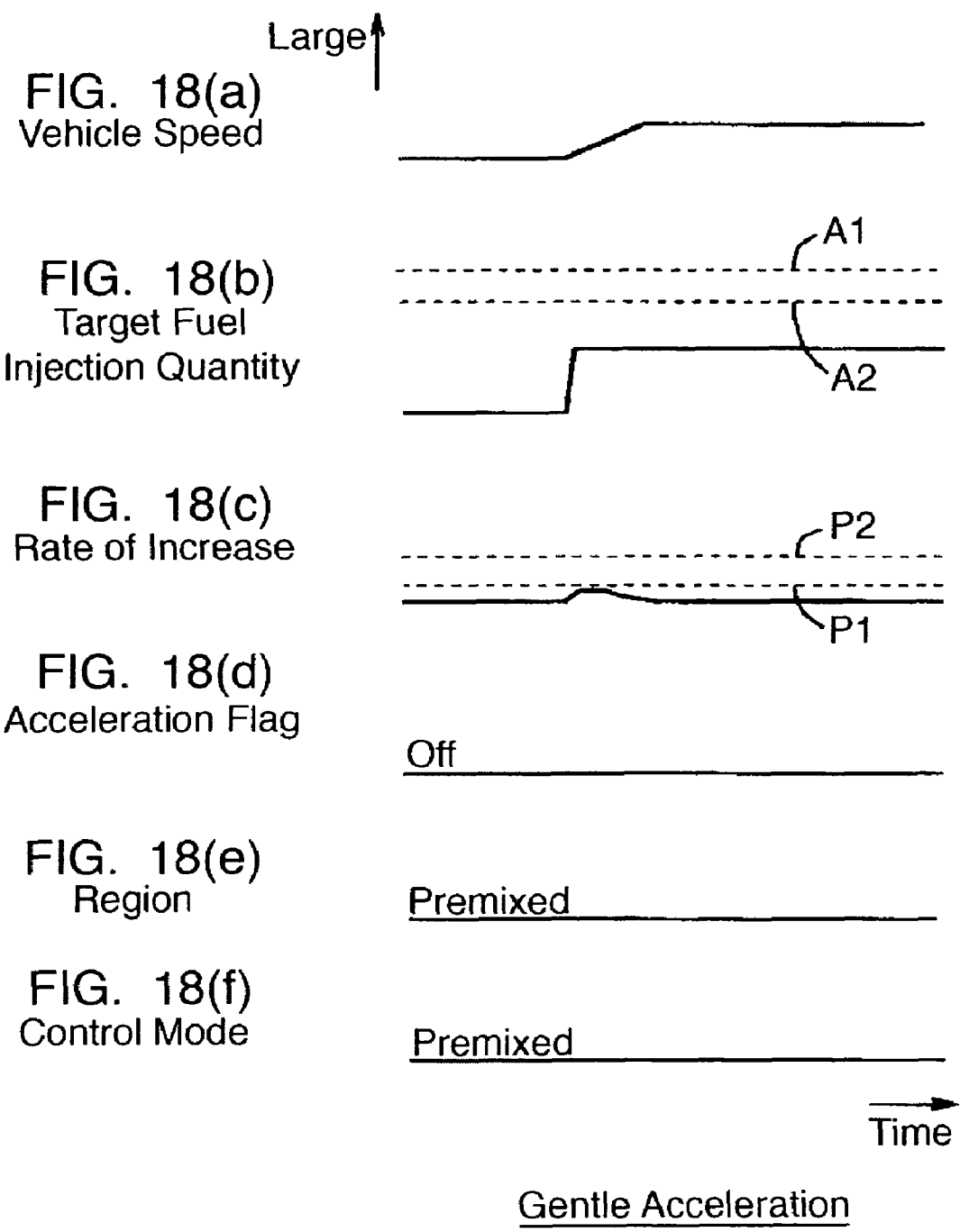

DIESEL ENGINE CONTROL DEVICE

CROSS REFERENCE TO RELATED APPLICATIONS

This application is entitled to the benefit of and incorporates by reference essential subject matter disclosed in International Patent Application No. PCT/JP2005/018316 filed on Oct. 4, 2005 and Japanese Patent Application No. 2004-293965 filed Oct. 6, 2004.

TECHNICAL FIELD

The present invention relates to a diesel engine control device, and more particularly to a diesel engine control device that controls switching between normal diffuse combustion and premixed compression ignition combustion.

BACKGROUND OF THE INVENTION

In diesel engines that directly inject fuel into the cylinders, the fuel was normally injected near the piston compression top dead center when there was high temperature and high pressure within the cylinder. In this case, ignition started and flames were formed while the fuel was being injected, and the combustion continued by supplying the subsequent fuel to the flames. Combustion of this form in which ignition started during injection of the fuel in this way is normally known as diffuse combustion (hereafter also referred to as normal combustion), but this diffuse combustion has the problem that there is a limit to the reduction of NOx, smoke, and the like.

Therefore in recent years, a form of combustion that is known as premixed compression ignition combustion (hereafter also referred to as premixed combustion) has been proposed to be realized in which the fuel injection or supply period is earlier than piston compression top dead center, and after fuel supply is completed the premixed fuel-air mixture ignites.

In premixed combustion, the premixed fuel-air mixture ignites after a certain period (premixed period) has passed after completion of fuel injection, so the premixed fuel-air mixture has sufficiently diluted and homogenized by the time ignition occurs. Therefore, the local combustion temperature is reduced, the quantity of NOx emissions is reduced, and combustion under insufficient air is avoided, so smoke generation is also reduced.

Patent Document 1: Japanese Patent Application Laid-open No. 2002-206448

Patent Document 2: Japanese Patent Application Laid-open No. 2000-145507

SUMMARY OF THE INVENTION

Premixed combustion is a form of combustion that is realized for the first time when uniform dilution of the premixed fuel-air mixture is obtained, and requires a comparatively high excess air ratio within the cylinder. At least at present, premixed combustion can only be implemented under the limited operating conditions of the low load region. Therefore in the high load region, it is necessary to implement normal diffuse combustion, and it is necessary to switch between premixed combustion and diffuse combustion according to the operating conditions of the engine.

The values of control parameters (injection timing, EGR quantity, and so on) required in premixed combustion and diffuse combustion respectively differ by a comparatively large amount, so there are times when it is necessary to transition between these significantly different values. Also in the case of vehicle engines, it is comparatively seldom that the engine operating conditions are constant, on the contrary continuous transition states such as accelerating and decelerating are frequent. When switching between premixed combustion and diffuse combustion under these engine transition states, it is possible that the transition in the actual values of control parameters is delayed, which can cause the drivability to degrade or the like.

Therefore, it is an object of the present invention to provide a diesel engine control device that is capable of carrying out smoothly and rapidly the switching between premixed combustion and diffuse combustion when the engine is in a transition state.

Also, it is another object of the present invention to provide a diesel engine control device that is capable of ensuring the desired drivability and accelerating performance by smoothly and rapidly carrying out the switching between premixed combustion and diffuse combustion in particular when the engine is accelerating.

According to the present invention, a diesel engine control device that controls the injection quantity and injection timing of fuel injected into the cylinder of a diesel engine is provided, wherein two control modes are provided: a normal injection mode in which the injection quantity and injection timing are controlled so that the injected fuel ignites near compression top dead center during the injection period; and a premixed injection mode in which the injection quantity and injection timing are controlled so that fuel injection is completed before compression top dead center and the injected fuel ignites near compression top dead center after a premixing period, the entire engine operating region is divided into at least two regions, which are a normal region and a premixed region, the diesel engine control device comprising: normal switching means for switching the control mode so that the normal injection mode is implemented when the actual engine operating conditions are in the normal region, and the premixed injection mode is implemented when the actual engine operating conditions are in the premixed region, and forcible switching means for forcibly switching one control mode to the other control mode when the engine enters a predetermined transition state while, in the one engine operating region, the one corresponding control mode is being implemented.

The diesel engine control device according to the present invention is particularly effective when the engine transition state is the acceleration state. In other words, when the premixed injection mode is being implemented in the premixed region, and when the engine enters a predetermined acceleration state, the forcible switching means forcibly switches the control mode to the normal injection mode.

Preferably, the forcible switching means switches the control mode based on a comparison of the rate of change of the engine load with a predetermined threshold value.

Preferably, means for executing a rounding process with respect to the rate of change is further provided, and the forcible switching means switches the control mode based on a comparison of the value after the rounding process with the threshold value.

The rate of change may be a rate of increase. In this case, it is preferable that two threshold values are provided on the increase side and the decrease side of the rate of increase, the forcible switching means starts the forcible switching when the rate of increase is equal to or greater than the increase side threshold value, and subsequently terminates the forcible switching when the rate of increase is equal to or less than the decrease side threshold value.

Preferably the increase side threshold value is set to a value lower than the decrease side threshold value.

Preferably, target values of control parameters for each control mode are set separately in advance, and the target values for the normal injection mode in the premixed region are set.

Preferably, an EGR device for recirculating a part of the exhaust gas to the gas inlet side, and EGR control means for executing control so that the actual EGR ratio approaches the target EGR ratio as a target value are provided, and the target EGR ratio in the premixed injection mode of the premixed region is set to 50% or greater.

Preferably, when the control mode is switched, at least one of the normal switching means and the forcible switching means gradually changes the target values of one control mode into the target values of the other control mode.

Preferably, when the control mode is switched, at least one of the normal switching means and the forcible switching means starts to change the target values for the fuel system behind the change in the target values of the gas inlet system.

Preferably, in the normal injection mode, a small quantity pilot injection and a large quantity main injection are carried out; and in the premixed injection mode, only a main injection is carried out; the target values comprise at least the target pilot injection quantity, the target pilot injection timing, the target main injection quantity, and the target main injection timing in the normal injection mode, as well as the target main injection quantity and the target main injection timing in the premixed injection mode; the target pilot injection quantity and the target pilot injection timing in the normal injection mode are associated with the target main injection quantity and the target main injection timing in the premixed injection mode respectively, and when switching control modes, at least one of the normal switching means and the forcible switching means effects changes between the target pilot injection quantity in the normal injection mode and the target main injection quantity in the premixed injection mode, and effects changes between the target pilot injection timing in the normal injection mode and the target main injection timing in the premixed injection mode.

Preferably, the engine comprises a reentrant type cavity provided in the top of a piston, and an injector whose injection angle is set so that the injected fuel enters the cavity in any of the control modes.

According to the present invention, it is possible to obtain the superior effects that switching between premixed combustion and diffuse combustion can be carried out smoothly and properly in the engine transition state.

BRIEF DESCRIPTION OF THE DRAWINGS

FIG. 7 is a time chart showing the variation in each target value when switching control modes.

FIG. 8 is a graph showing the variation in the values of the air intake system corresponding to variations in the engine load.

FIG. 9 is a time chart showing the variation in injection quantity and injection timing when switching control modes.

FIG. 15 is a graph showing the variation in the values for the inlet gas system when the forcible switching control is carried out.

FIG. 16 is a time chart showing an example of forcible switching control, for the case of sudden acceleration.

FIG. 17 is a similar time chart, for the case of medium and low acceleration.

FIG. 18 is a similar time chart for the case of gentle acceleration.

BEST MODE FOR CARRYING OUT THE INVENTION

The following is a detailed description of the best mode for carrying out the invention based on the attached drawings.

Figure 1:
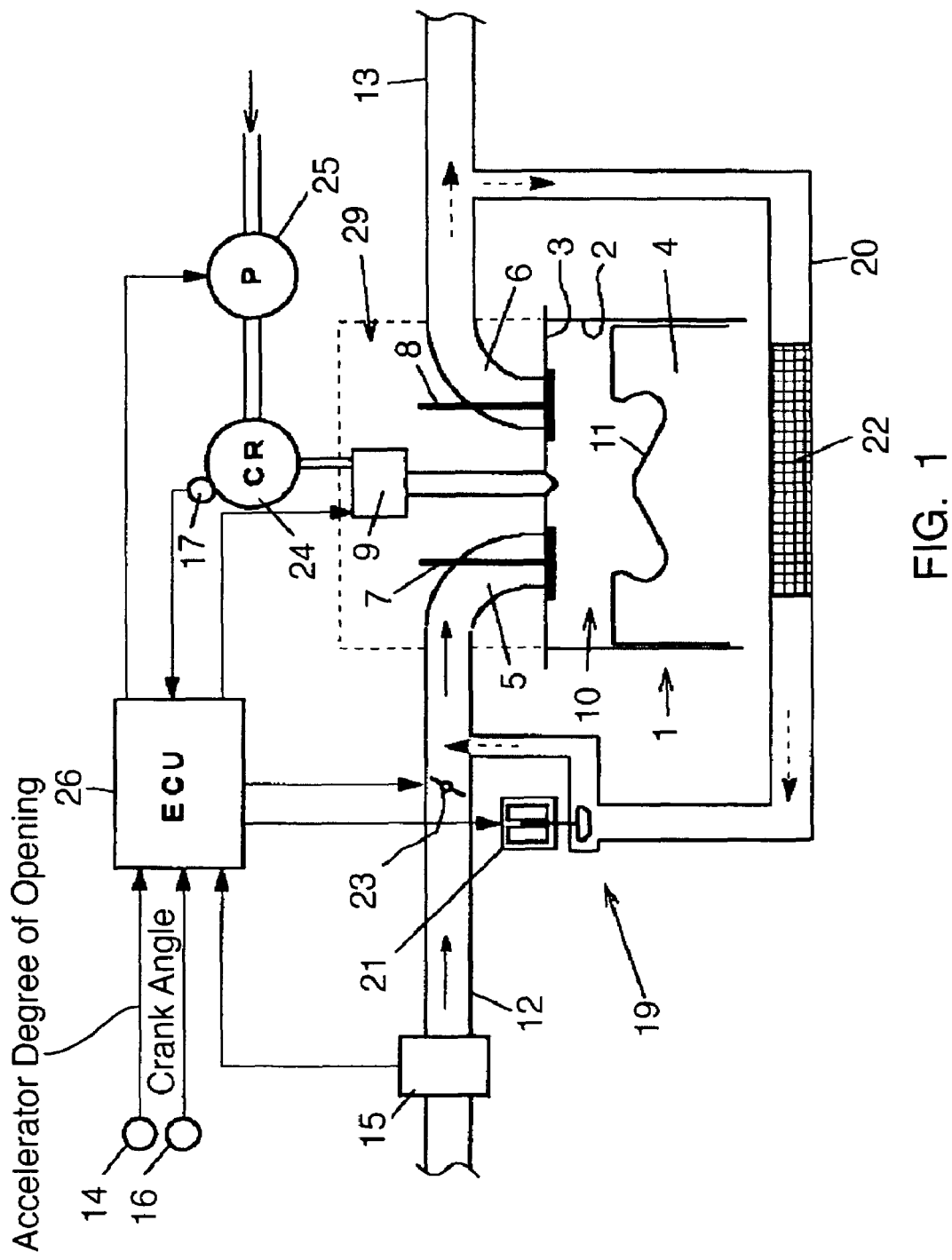
FIG. 1 is a schematic diagram of a diesel engine according to an embodiment of the present invention.

FIG. 1 shows a control device for a diesel engine (hereafter simply referred to as the engine) according to the present embodiment. FIG. 1 shows only one cylinder, but of course there may be many cylinders.

In the figure, 1 is the main engine body, which includes a cylinder 2, a cylinder head 3, a piston 4, an air inlet port 5, an exhaust port 6, an air inlet valve 7, an exhaust valve 8, and an injector 9, and so on. A combustion chamber 10 is formed by the space enclosed by the cylinder 2, the cylinder head 3, and the piston 4. A cavity 11 is formed as a depression in the top of the piston 4, and the injector 9 that is provided facing the combustion chamber 10 directly injects fuel towards the cavity 11.

The cavity 11 and the injector 9 of the engine according to the present embodiment are designed to be the same as those for a normal diesel engine designed on the assumption of realizing diffuse combustion.

Figure 2A:
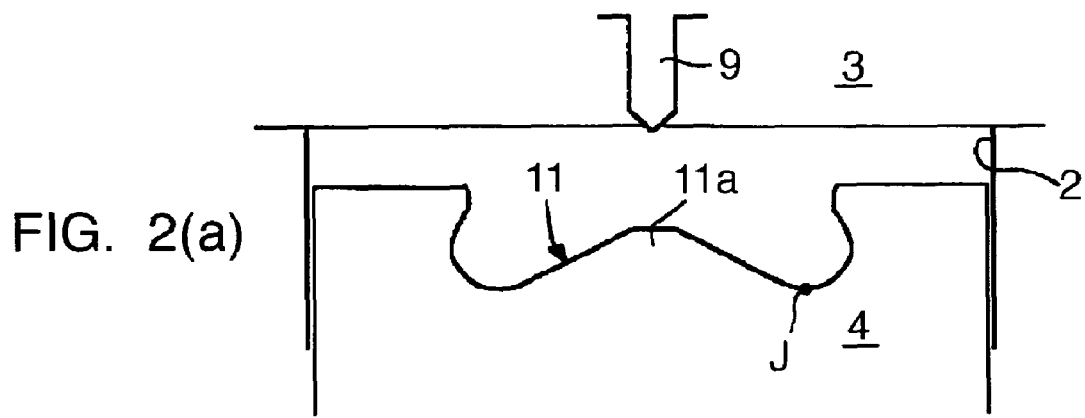
FIG. 2 is a diagram showing the relationship between fuel injected from the injector and the piston.
Figure 2B:
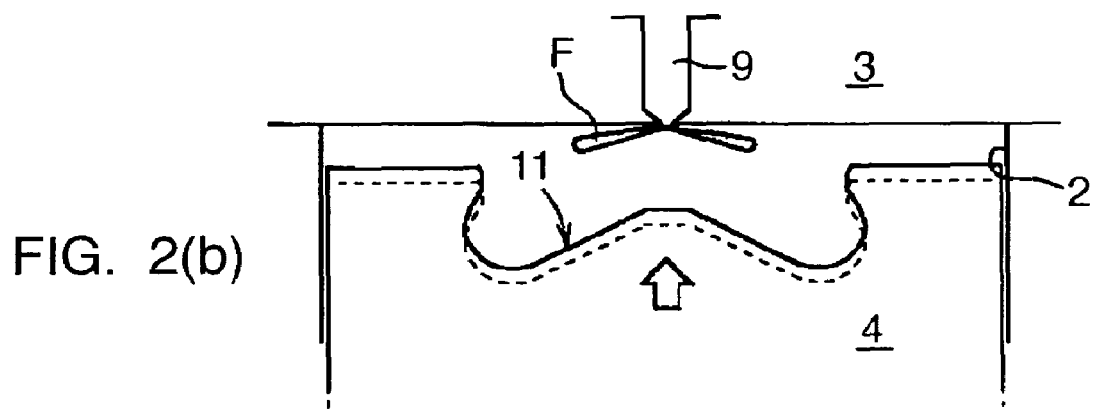
Figure 2C:
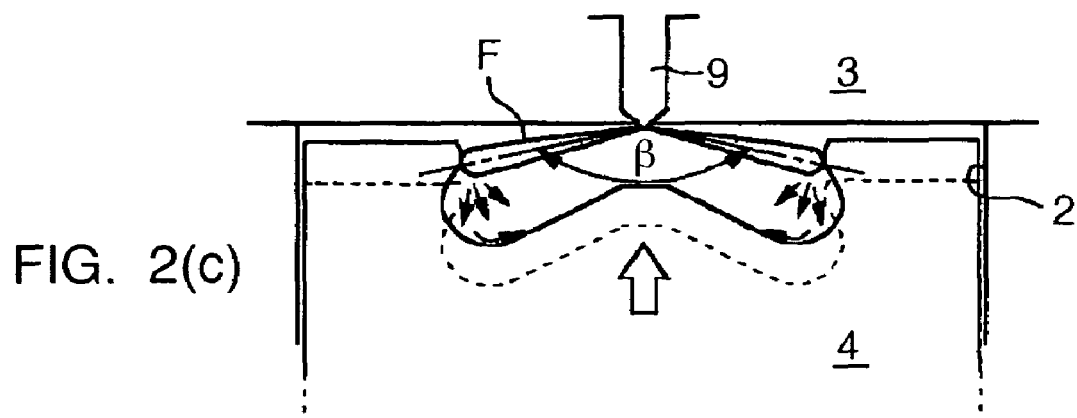

23Specifically, as shown in FIG. 2, the cavity 11 of the present embodiment is a reentrant cavity in which the area of the aperture (the top end portion) is formed smaller than the cross-sectional area of the parts below, and with a convex part that rises up formed in the center of the bottom of the cavity 11. The injector 9 is disposed substantially concentric with the cylinder 2, and injects fuel at a normal injection angle β (for example, within the range of 140° to 165°) from a plurality of injection holes.

Returning to FIG. 1, the injector 9 is connected to a common rail 24, and high pressure fuel that is stored in the common rail 24 is constantly supplied to the injector 9. A high pressure supply pump 25 supplies fuel under pressure to the common rail 24.

The air inlet port 5 is connected to an air inlet pipe 12, and these form the air inlet passage. The exhaust outlet port 6 is connected to an exhaust pipe 13, these form the exhaust passage.

The engine according to the present embodiment further includes an EGR device 19 that recirculates a part of the exhaust gas (the EGR gas) to the air inlet side.

The EGR device 19 includes an EGR pipe 20 that connects the inlet pipe 12 and the exhaust pipe 13, an EGR valve 21 that modifies the area of the passage of the EGR pipe 20 to adjust the EGR ratio, and an EGR cooler 22 that cools the EGR gas at the upstream of the EGR valve 21. By increasing the degree of opening of the EGR valve 21, the EGR ratio and EGR quantity of the inlet gas inlet in the cylinder can be increased, and conversely by reducing the degree of opening of the EGR valve 21, the EGR ratio and EGR quantity of the inlet gas can be reduced.

An inlet air throttle valve 23 is provided in the inlet pipe 12 upstream of the connection with the EGR pipe 20 to throttle the inlet air as appropriate. The inlet air throttle valve 23 is also included in the EGR device 19. By opening and closing the inlet air throttle valve 23, the quantity or percentage of inlet air (new air) as a percentage of the total inlet gas can be adjusted, so the EGR ratio can be adjusted. In other words, by increasing the valve degree of opening of the inlet air throttle valve 23, the quantity (percentage) of inlet air is increased, and the EGR ratio and EGR quantity of the inlet gas can be reduced. Conversely, by reducing the valve degree of opening of the inlet air throttle valve 23, the quantity of inlet air is reduced, and the EGR ratio and EGR quantity of the inlet gas can be increased.

An electronic control unit (hereafter referred to as the ECU) 26 is provided for electronic control of the engine. The ECU 26 (control device) reads the operating conditions of the engine from many types of sensors, and based on the engine operating conditions controls the injector 9, the EGR valve 21, the inlet air throttle valve 23, and so on. These sensors include an accelerator degree of opening sensor 14 that detects the degree of opening of the accelerator, a crank angle sensor 16 that detects the phase of the crankshaft (not shown in the drawings) of the engine, in other words crank angle, a common rail pressure sensor 17 that detects the fuel pressure in the common rail 24, an inlet air quantity sensor 15 that detects the inlet air quantity, and so on. Based on the output signals from each of these sensors, the ECU 26 determines the actual accelerator degree of opening, crankshaft angle, common rail pressure, inlet air quantity, and so on. In particular, the ECU 26 determines the engine load L based on the value of accelerator degree of opening, calculates the rate of increase in the crank angle with respect to time and determines the actual engine rotation speed NE.

The ECU 26 turns the injector 9 ON or OFF, so that the injector 9 executes or stops fuel injection. The ECU 26 determines the target values of fuel injection quantity and fuel injection timing based on parameters representing the operating conditions of the engine detected by the sensors, in particular the detected values of the engine rotation speed NE and the engine load L, and when the actual crank angle reaches the target injection timing, the injector 9 is turned ON from that timing for a period of time corresponding to the target injection quantity. In other words, the injection quantity corresponds to the electrification time of the injector, and the injection timing is the injector 9 electrification start time, in other words the injection start timing. The target injection quantity and target injection timing are determined in advance through actual tests or similar, and the values are stored in the memory within the ECU 26 in map form.

Feedback control is also carried out for the common rail pressure, namely, the injection pressure. In other words, the ECU 26 determines the target value of common rail pressure from the maps recorded in advance, based on parameters representing the operating conditions of the engine detected by the sensors, in particular the detected values of the engine rotation speed NE and the engine load L, and controls the degree of opening of an adjustment valve that is not shown in the drawings to control the fuel supply quantity to the common rail 24 from the high pressure supply pump 25 so that the actual common rail pressure approaches the target value.

Furthermore, feedback control is carried out for the EGR ratio. The ECU 26 carries out control so that the actual EGR ratio approaches the target EGR ratio. In the present embodiment, the inlet air quantity is controlled to control the EGR ratio. The details of this EGR control will become clear later.

Figure 3:
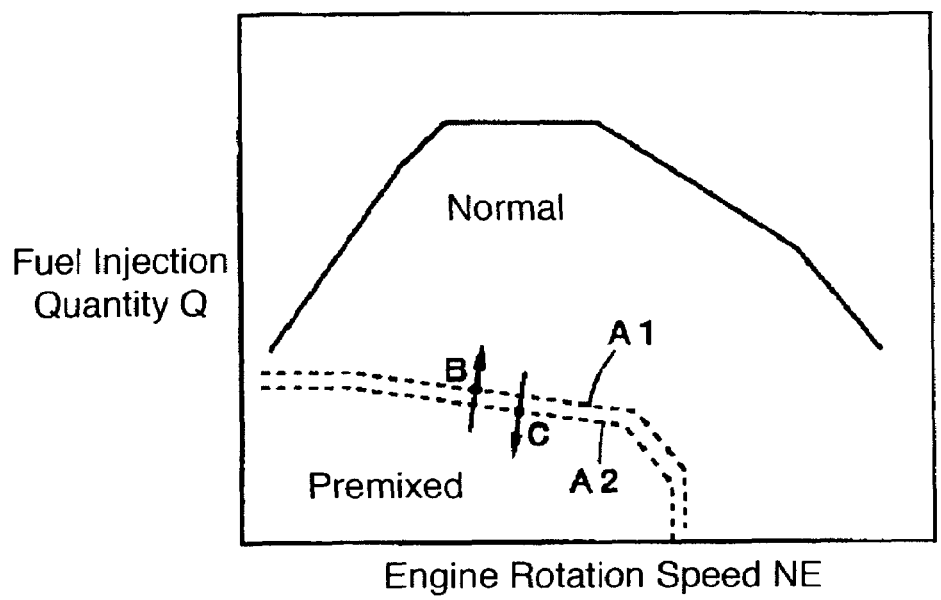
FIG. 3 is a map showing the premixed region and the normal region among the engine operating regions.

The engine according to the present embodiment implements premixed combustion in a predetermined operating region as explained in the section "Background Art", and in other operating regions, implements normal diffuse combustion. Specifically, as shown in FIG. 3, the totality of engine operating regions defined by parameters (in the present embodiment, the engine rotation speed NE and the fuel injection quantity Q) representing the engine operating conditions is divided in advance into the region in which premixed combustion is implemented (premixed region) and the region in which normal diffuse combustion is implemented (normal region), and mode switching values A1, A2 that define the boundary of each of these regions are determined in advance. The premixed region is set on the low load side relative to the normal region.

Also, the control device according to the present embodiment has two control modes: a premixed injection mode that is implemented in the premixed region, and a normal injection mode that is implemented in the normal region. When the actual engine rotation speed NE and the fuel injection quantity Q are in the premixed region, control is implemented according to the premixed injection mode, and when they are in the normal region, control is implemented according to the normal injection mode. If, during engine operation, the operating conditions change from the premixed region to the normal region or vice versa, the control mode is also switched accordingly. This will be explained in detail later.

As stated above, the engine according to the present embodiment implements the premixed combustion using the reentrant type cavity 11 and the injector 9 having a normal injection angle $\beta$. In the premixed region, the ECU 26 controls the fuel injection start time so that fuel injection is completed before compression top dead center of the piston 4, and so that all the injected fuel enters the cavity 11. This injection time is for example within the range 5 to 35° before top dead center. The fuel injection timing is advanced to be earlier than that of normal combustion, but the advance angle is limited to that range for which all the injected fuel will enter the cavity 11, and not miss the cavity 11.

Here, a more detailed explanation of the injection timing (injection start time) is provided based on FIG. 2.

FIG. 2(*a*) shows the condition at the fuel injection start time (the instant the injector 9 is turned ON). At this time, the fuel is not injected from the injector 9, and the piston 4 is positioned comparatively low. Then, as shown in FIG. 2(*b*), after some time period has passed, the piston 4 rises for a little, and fuel F starts to be dispersed to the outside in the radial direction from the injector 9. However, at that point of time, the fuel F has not reached the cavity 11 of the piston 4. Then, as shown in FIG. 2(*c*), when a further period of time has passed, the fuel F impacts the top portion of the side wall of the cavity 11. At this time, the injection timing set in the present embodiment is the injection timing so that all the fuel F is supplied within the cavity 11. Conversely, an injection timing for which part of the fuel that impacts the cavity 11 is reflected upwards and adheres to the bottom surface of the cylinder head 3 is not set in the present embodiment.

Normally, in premixed combustion, compression auto-ignition of the premixed fuel-air mixture occurs depending upon the temperature, pressure and the like within the cylinder, so it is difficult to control the ignition timing. Therefore, in the present embodiment, the EGR ratio is controlled in order to control the ignition timing. From the output and fuel consumption point of view, it is desirable that the ignition timing is near compression top dead center, but in premixed combustion, the fuel is injected earlier than with normal diffuse combustion, so, depending on the conditions within the cylinder, there is a possibility that ignition will occur before reaching near the compression top dead center. Therefore, in EGR control, the target EGR ratio of the inlet gas (inlet air+EGR gas) supplied within the cylinder is set higher than for normal combustion, so that the ignition timing is delayed as the injection time is early, so that ignition is controlled to occur near compression top dead center. Specifically, the target EGR ratio is set to 50% or greater.

Figure 13:
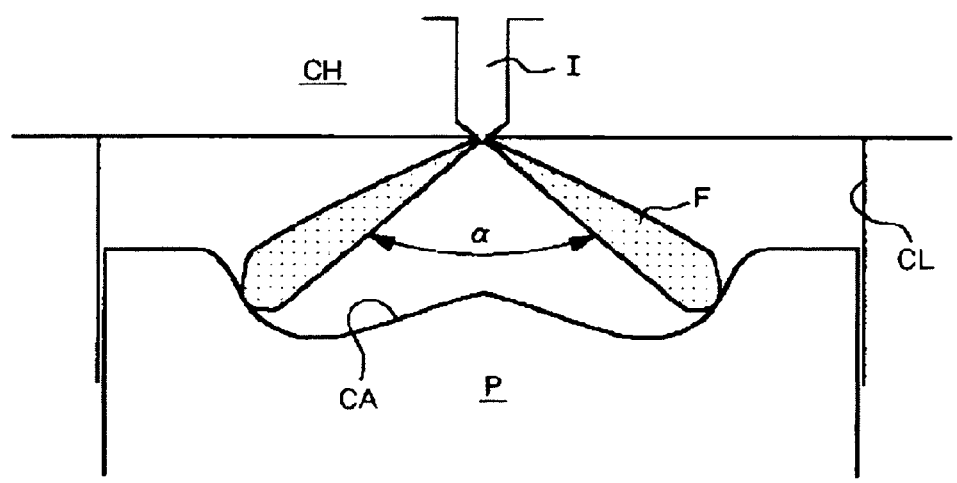
FIG. 13 is a schematic diagram showing a conventional open type engine.

Also, in a conventional engine that implements premixed combustion, as shown in FIG. 13, a comparatively narrow injection angle α is combined with a shallow dish shaped or open type cavity CA, so that even if the injection timing advanced to earlier, the fuel injected from the injector is certain to reach the cavity CA. In contrast to this, when an injector 9 having a normal injection angle β (within the range of 140° to 165°) is used, as in the present embodiment, the injection angle is wider than the conventional case, and the range within which the injection timing can be advanced is smaller than the conventional engine. Hence, the fuel is injected under conditions in which the pressure and temperature within the cylinder are comparatively high, so there is a risk of ignition before compression top dead center. However, in the present embodiment, as stated above, the target EGR ratio is set to a comparatively high value, so it is possible to delay the ignition time and to control it to near the compression top dead center.

In the present embodiment, to control the EGR ratio, a map of the target values of the inlet air quantity corresponding to the engine operating conditions are stored in advance in the ECU 26 (see FIG. 6), and the ECU 26 controls either one or both of the EGR valve 21 and the inlet air throttle valve 23 so that the actual inlet air quantity approaches the target inlet air quantity, in accordance with this map. This map of target values of inlet air quantity is determined in advance so that the actual EGR ratio becomes the target EGR ratio when the inlet air quantity is controlled in accordance with this map. Here the inlet air quantity is a value that corresponds to the EGR ratio. This is because for a constant inlet gas quantity, if the inlet air quantity is increased the EGR ratio decreases, and if the inlet air quantity is decreased the EGR ratio increases. The inlet quantity is determined by the engine rotation speed, so it is possible to calculate the EGR ratio from the engine rotation speed and the inlet air quantity.

In this way, by reducing the oxygen concentration in the premixed fuel-air mixture by implementing a comparatively large quantity of EGR with the EGR device 19, it is possible to ensure a sufficient premixing time. Therefore, it is possible to ensure the implementation of premixed combustion in the engine according to the present embodiment, in which the fuel injection start timing cannot be very early. Also, the ignition timing is controlled to be the appropriate timing (near the piston compression top dead center) by controlling the EGR ratio (in the present embodiment, the inlet air quantity is controlled), so it is possible to ensure sufficient fuel consumption and output. Furthermore, by reducing the oxygen concentration in the fuel-air mixture by implementing with a large quantity of EGR, it is also possible to reduce the NOx in the exhaust gas.

Figure 4:
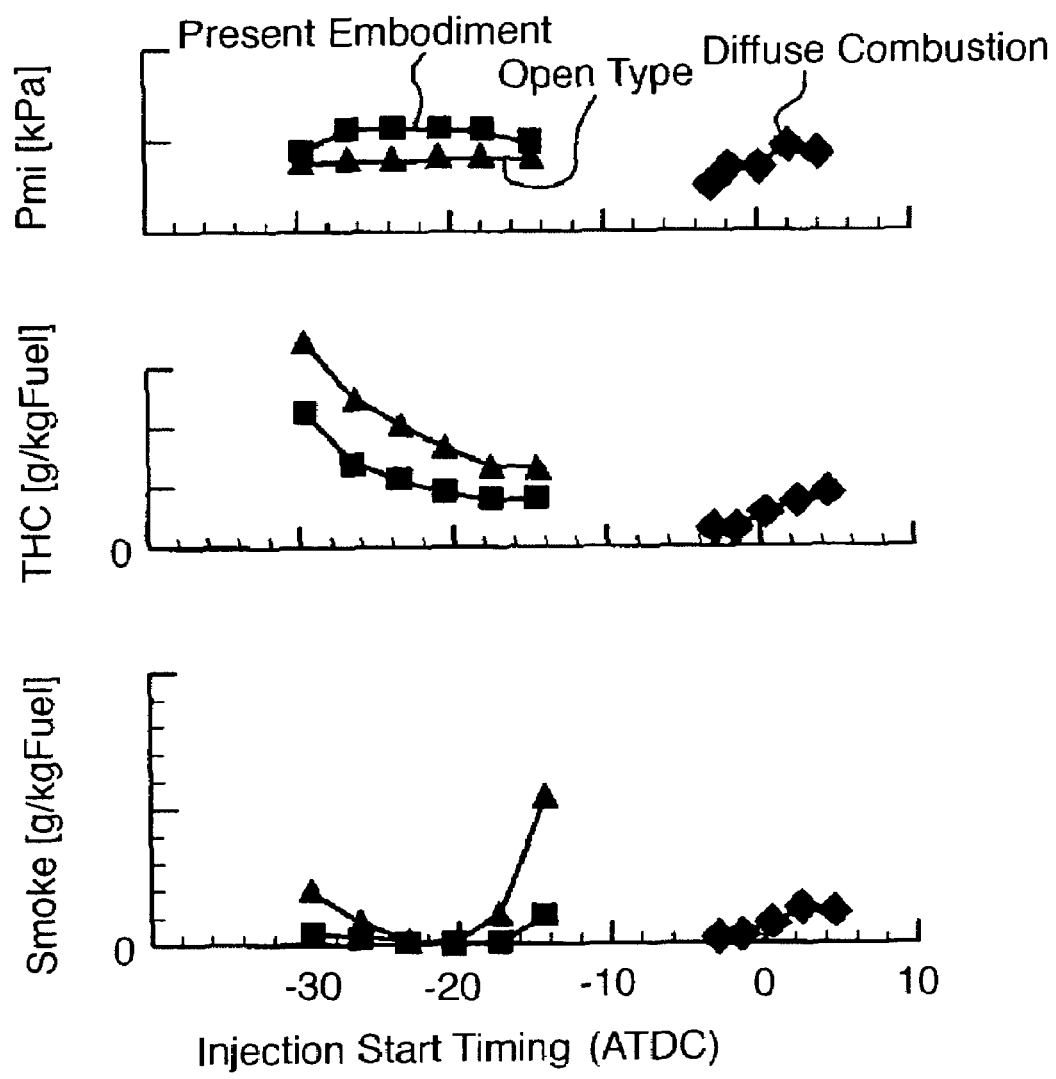
FIG. 4 is a graph showing the results of a comparison between a diesel engine according to the present embodiment and a conventional open type engine.

FIG. 4 shows measured results for mean effective pressure Pmi, THC emission quantity, and smoke emission quantity for the engine according to the present embodiment and an engine using an open-type cavity CA and an injector I with a narrow injection angle α (hereafter referred to as the open-type engine) as shown in FIG. 13.

The horizontal axis in the figure is fuel injection start time (ATDC), the lines joining the square points in the figure show the measured results for the engine according to the present embodiment, and the lines joining the triangular points show the measured results for the open type engine. The lines joining the diamond shaped points are the measured results for a normal diesel engine with diffuse combustion which are shown for reference.

As can be seen from the figure, the mean effective pressure Pmi (which corresponds to the engine output) for the engine according to the present embodiment is greater than that of the open type engine for all injection start times.

Also, for the quantity of THC or smoke emissions, for all injection start timings, the emissions were the same or lower than those of the open type engine. A point worthy of special mention is that, for the engine according to the present embodiment, the quantity of smoke emissions is low over a wide range of injection start timings. This means that there is a lot of flexibility in setting the injection start timing. In other words, the range of injection start timings in the open type engine for which the quantity of smoke emissions is low is narrow (−26° to −18° ATDC), so the possible setting range of the injection timing is narrow. However, in the engine according to the present embodiment, there is a wide range of injection timings for which the quantity of smoke emissions is low (−30° to −14° ATDC), so the injection timings may be freely set within this wide range.

It is believed that the reason why the engine according to the present embodiment is superior with respect to both output and gas emissions compared with the open-type engine is the effect of the reentrant type cavity 11. In other words, with the reentrant type cavity 11, combustion of virtually all the fuel occurs within the cavity 11, and this is thought to result in improved output. Also, with a reentrant cavity 11 it is possible to maintain for a long time within the cavity 11, the swirl that is formed within the cavity 11, so sufficient dilution and homogenization occurs due to the premixing of the premixed fuel-air mixture. This is considered to lead to the improvement in the exhaust gas. Further, another advantage of the reentrant cavity 11, namely high squish formation, is also considered to contribute to the improvement in the exhaust gas.

Figure 5:
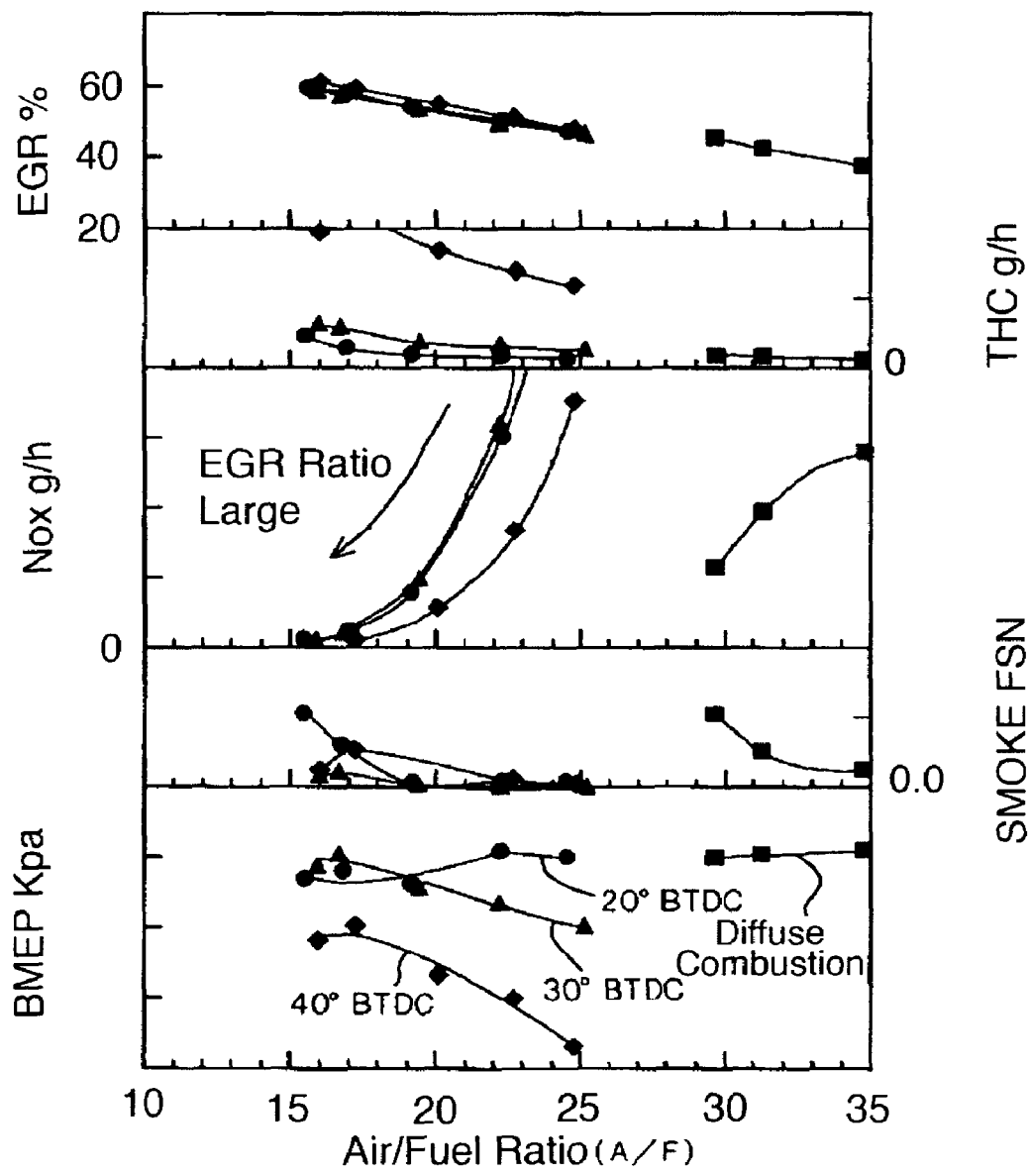
FIG. 5 is a graph showing the results of measurements of the changes in each value corresponding to variations in the injection timing in premixed combustion.

FIG. 5 shows the measured results for THC emission quantity, NOx emission quantity, smoke emission quantity, and brake mean effective pressure BMEP (which corresponds to the output) when the EGR ratio is varied between about 40 to 60%, for three types of setting for the fuel injection start time in an engine according to the present embodiment.

The horizontal axis of the figure is the air to fuel ratio (A/F) of the premixed fuel-air mixture, the lines connecting the circular points in the figure are injection timing 20° BTDC, the lines connecting the triangular points are injection timing 30° BTDC, and the lines connecting the diamond shaped points are injection timing 40° BTDC. The lines connecting the square points are the measured results for a normal diesel engine with diffuse combustion which are shown for reference.

As can be seen from the figure, the THC emission quantity is virtually the same for injection timing 20° BTDC and 30° BTDC, and only for injection timing 40° BTDC is the THC emission quantity greatly increased. Also, the brake mean effective pressure BMEP is virtually the same for injection timing 20° BTDC and 30° BTDC, and only for injection timing 40° BTDC is the brake mean effective pressure BMEP greatly reduced.

In this way, when the injection timing is 40° BTDC, the THC emission quantity and the output are both worse than for injection timing 20° BTDC and 30° BTDC; it is considered that this is caused by a part of the injected fuel being dispersed from the cavity 11 to the outside.

In other words, in the case of injection timing 20° BTDC and 30° BTDC, all the injected fuel enters the cavity 11, so both THC emission quantity and output are good, and no large difference can be seen between the two, but in the case of injection timing 40° BTDC, the injection timing is too early so a part of the fuel is dispersed outside the cavity 11, and this fuel adheres to the bottom surface of the cylinder head 3 and elsewhere, which results in THC emissions. Also, the fuel that is dispersed outside the cavity 11 cannot burn within the cavity 11, so it may be considered that this results in reduced output.

Next, focusing on the relationship between EGR ratio and exhaust gas and output in FIG. 5, it can be seen that for all injection timings, the higher the EGR ratio the lower the NOx emission quantity. This is because the oxygen concentration in the premixed fuel-air mixture is reduced by the large quantity of EGR. As can be seen from the figure, in the case of fuel injection timing 20° BTDC and 30° BTDC, if the EGR ratio is 50% or greater, the NOx emission quantity is reduced to virtually the level of zero. For THC emission quantity, smoke emission quantity, and brake mean effective pressure BMEP, no clear correlation with the EGR ratio was observed.

From the measured results in FIG. 5, it can be seen that with an engine according to the present embodiment in which the injection timing is set so that all the fuel enters the cavity 11 and that has a large quantity of EGR, superior exhaust gas characteristics and output can be obtained.

The engine according to the present embodiment implements normal diffuse combustion in the high load region. The engine according to the present embodiment uses a reentrant type cavity 11 and a normal injector 9 with a comparatively wide injection angle β, which are suitable for diffuse combustion, so good combustion can be obtained when implementing diffuse combustion. In other words, when the fuel is injected near compression top dead center to implement diffuse combustion, the injected fuel impacts the side wall of the cavity 11, same as for a normal diesel engine, so there is no large scale generation of smoke or the like. Also, because of the reentrant cavity 11, the swirl formed within the cavity 11 can be kept within the cavity 11, so superior exhaust gas characteristics can be obtained.

Therefore, according to the engine of the present embodiment, in the low load region, good premixed combustion can be implemented as stated previously, and in addition when the combustion is switched to diffuse combustion, good combustion can also be obtained in the high load region.

Here, the injection angle β of the injector 9 is set as follows in order to positively implement good diffuse combustion. The injection angle β is such that the fuel injected near the piston 4 compression top dead center reaches the inner wall of the cavity on the outside in the radial direction of the lowest position J (see FIG. 2(a)) of the cavity 11. If the injection angle β of the injector 9 is made narrower until the angle is just within the range to satisfy this condition, diffuse combustion and premixed combustion can suitably be compatible, as well as when implementing premixed combustion, the fuel injection start time can be advanced to relatively earlier.

In the engine according to the present embodiment, it is desirable to use a high swirl type cylinder head 3 or air inlet port 5, to further promote mixing of the premixed fuel-air mixture. For example, a swirl generation device may be provided in the air inlet port 5.

Also, an external EGR device in which a part of the exhaust gas within the exhaust pipe 13 is recirculated to the air inlet pipe 12 has been indicated as the EGR device in the embodiment described above. However, the present invention is not limited on this point, and an internal EGR device in which exhaust gas is recirculated to the combustion chamber 10 by controlling the opening and closing of the exhaust valve 8 or the inlet air valve 7 may be used.

According to the present embodiment, as was explained in connection with FIG. 3, two control modes are provided: a premixed injection mode that is implemented in the premixed region, and a normal injection mode that is implemented in the normal region. Also, during engine operation, the values of the actual engine rotation speed NE and the target fuel injection quantity Q are constantly compared with the predetermined mode switching values, and if these values reach the mode switching values, the control mode is switched. This is the normal switching control.

In the present embodiment, hysteresis is set in the mode switching values. This is to prevent repeated switching of control mode in quasi-steady operation, and to stabilize the control. The high load side mode switching value is A1, the low load side mode switching value is A2, and these values are close to each other. In cases when the engine is accelerated while operating in the premixed region, when the values of the actual engine rotation speed NE and the target fuel injection quantity Q reach the high load side mode switching value A1, the control mode is switched to the normal injection mode (the switching point is indicated as B). On the other hand, in cases when the engine is decelerated while operating in the normal region, when the values of the actual engine rotation speed NE and the target fuel injection quantity Q reach the low load side mode switching value A2, the control mode is switched to the premixed injection mode (the switching point is indicated as C).

In the premixed injection mode, fuel injection is completed before compression top dead center, and the injection quantity and injection timing are controlled so that after the premixing period has passed, the injected fuel ignites near compression top dead center. Also, in the normal injection mode, the injection quantity and injection timing are controlled so that the injected fuel ignites near compression top dead center during the injection period.

Figure 6:
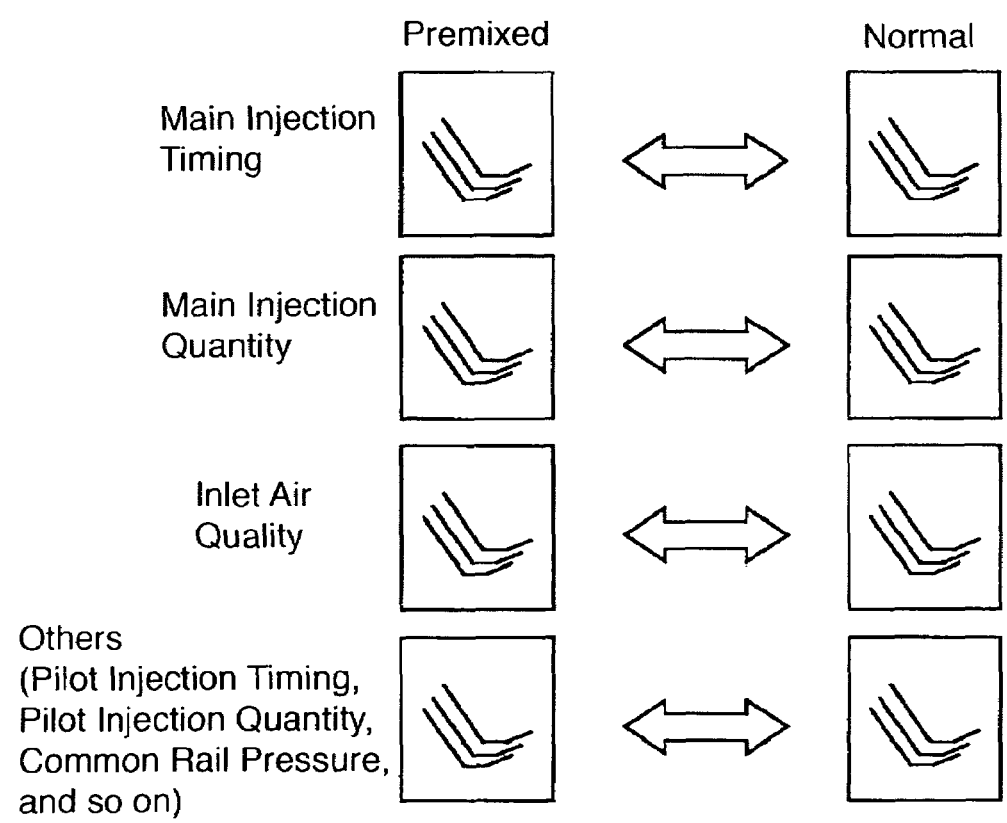
FIG. 6 shows a map of target values of each control parameter in the premixed injection mode and the normal injection mode.

As shown in FIG. 6, the target values of the respective control parameters of the premixed injection mode and the normal injection mode are set separately. In other words, maps of the target values of the control parameters (main injection timing, and so on) corresponding to one or more parameters that represent the engine operating condition (engine rotation speed, engine load, and so on) are prepared in advance for each of a plurality of different control parameters respectively. Furthermore, for the same control parameter, a map for premixed injection mode and a map for normal injection mode are prepared. The control parameters in the present embodiment include main injection quantity, main injection timing, pilot injection quantity, pilot injection timing, inlet air quantity, and common rail pressure. However, in an engine that comprises a variable capacity turbocharger for example, various other parameters such as turbocharge pressure, movable vane degree of opening or the like, may be included. This will be described in detail later, but in the present embodiment, a main injection is carried out only once in the premixed injection mode, but in normal injection mode, fuel injection is carried out twice: a pilot injection and a main injection.

In this way, two sets of target values are separately and independently set in respect of the same control parameter, so immediately after switching the control mode, the target values can vary greatly even though engine operating condition is almost the same. If the target values are changed suddenly and greatly (in other words, in a step-like manner) when switching control modes, the actual values will also suddenly and greatly change accordingly, so it is possible that combustion noises or torque fluctuations will be generated, or the exhaust gas may deteriorate during the transition.

Therefore, to avoid these problems, it is desirable that the target values are gradually changed when the control mode is switched. This is executed by the control device according to the present embodiment, and the situation is as shown in FIG. 7. In the example shown in the figure, at the time t1, the control mode is switched from normal injection mode to premixed injection mode, then later at time t3, the control mode is switched from the premixed injection mode to the normal injection mode. During this switch, the target values of each control parameter are changed from the values of one control mode (for example, V1) to the values of the other control mode (for example, V2), however, during this change the one value is gradually changed into the other value over a period of time. In other words, it is desirable that the change from one value to the other value is not an instantaneous sudden step-like change, but a gentle sloping-like manner is conducted over a period of time. This type of change can be achieved by for example performing a rounding process on a step input that is the basis, and taking the output to be the target value. By gradually changing the target values in this way, sudden changes in the actual values can be prevented, and it is possible to prevent combustion noises, torque fluctuations, and deterioration of the exhaust gas during the transition.

In addition, in the present embodiment, when switching control modes, delay control is carried out for the change in target values of the fuel system relative to the changes in target values of the gas inlet system. The target values of the fuel system referred to here are in the example shown in the figure, target main injection quantity, target main injection timing, target pilot injection quantity, target pilot injection timing, and target common rail pressure, and the target value for the gas inlet system in the example shown in the figure is target inlet air quantity.

As shown in FIG. 7, after starting to change the target value associated with the gas inlet system, the target values associated with the fuel system start to change. For example, at time t1, when the control mode is changed from the normal injection mode to the premixed injection mode, the target inlet air quantity starts to change, then when the target inlet air quantity reaches a predetermined threshold value MAF1 (time t2), the target main injection quantity, the target main injection timing, the target pilot injection quantity, the target pilot injection timing, and the target common rail pressure start to change. In this way, execution of the change in the target values of the fuel system is delayed only by $\Delta t1 = t2 - t1$ relative to the change in target value of the gas inlet system.

In the same way, at time t3, when the control mode is switched from the premixed injection mode to the normal injection mode, first the target inlet air quantity starts to change, then when the value of the target inlet air quantity reaches a predetermined threshold value MAF2 (time t4), the target main injection quantity, the target main injection timing, the target pilot injection quantity, the target pilot injection timing, and the target common rail pressure start to change. In this way, execution of the change in the target values of the fuel system is delayed only by $\Delta t3 = t4 - t3$ relative to the change in target value of the gas inlet system.

The reason for doing this is a difference in responsiveness which the change in the actual value of the gas inlet system is delayed relative to the actual values of the fuel system. In other words, if the target inlet air quantity is changed, and assuming that the degree of opening of the air inlet throttle valve 23 and the EGR valve 21 is instantly changed corresponding to this target value, there is a certain distance and capacity between the air inlet throttle valve 23 and the EGR valve 21 and the combustion chamber 10 within the cylinder, so a fixed period of time passes before the actual EGR ratio of the inlet gas in the combustion chamber 10 changes to correspond to the target value. Also, the target EGR ratio in the premixed region is set to the comparatively high value of 50% or higher, and in contrast the target EGR ratio in the normal region is about 30% or less. Therefore, when moving between regions, the change in target EGR ratio is large, and this is also a reason for the delay in the response of the actual EGR ratio. On the other hand, for the values of the fuel system, if a signal corresponding to the target value is sent to the injector 9, the change is instantaneous. Also, changes of the common rail pressure can be made comparatively rapidly. Therefore, the changes in the values for the fuel system which can be changed rapidly are delayed relative to the value for the gas inlet system, as in the present embodiment, so that after waiting for the actual change in the actual EGR ratio in the combustion chamber 10, the values for the fuel system are changed, so it is possible to realize the required form of combustion. In particular, the EGR ratio is an important parameter in premixed combustion, so it is important to carry out control in accordance with the actual EGR ratio.

FIG. 8 shows the variation in the values of the air intake system corresponding to variations in the engine load. In each of the graphs FIG. 8(a) to FIG. 8(c), the horizontal axis is the engine load, and the vertical axes are (a) inlet air quantity, (b) EGR ratio, and (c) air to fuel ratio (A/F). In each graph, the solid line is the value in normal injection mode, and the broken line is the value in the premixed injection mode. The lines in FIG. 8(a) show target values, and the lines in (b) and (c) show the actual values.

When the engine load increases, such as when accelerating, each value varies in accordance with the thick arrowed line E. While the premixed injection mode is implemented, each value changes by moving to the right along the broken lines. Then when the switching point B is reached, each value changes to the value on the solid line, which are the values for the normal injection mode, and thereafter each value changes by moving to the right along the solid line. At the switching point B, each value is changed as shown at E1, but as stated before in the present embodiment, the control is implemented to gradually change, so the changes are comparatively slow.

As shown in FIG. 8(b), in the premixed injection mode in the premixed region, the EGR ratio is 50% or greater, and just before the switching point B is close to 50%, with the value becoming larger as the load becomes lower. Then when switching to the normal injection mode, the EGR ratio is greatly reduced to 30% or less, just after the switching point B is near 30%, with the value becoming smaller as the load becomes higher. To change the EGR ratio in this way, the target EGR ratio is set, and in the present embodiment, the target inlet air quantity is set as in FIG. 8(*a*). In FIG. 8(*a*), the value of the inlet air quantity increases as the load increases. This corresponds to the reducing EGR ratio. Then, when switching from the premixed injection mode to the normal injection mode, the inlet air quantity changes to a larger value.

The variation in A/F corresponding to the variation in EGR ratio as stated before is shown in FIG. 8(*c*). In the premixed injection mode in the premixed region, A/F has a value greater than the stoichiometric ratio (theoretical air to fuel ratio: about 14.5) (in other words, on the lean side), and gradually reduces as the engine load increases, and at the switching point B, it reaches near the stoichiometric ratio (in other words, a value slightly larger than the stoichiometric ratio, for example 15). This value is the limit for implementing the premixed combustion. Then when switching to the normal injection mode at the switching point B, A/F is again increased, then after decreasing for a while maintains a virtually constant value. As shown in the figure, there is a smoke generation region within a fixed range of A/F that is higher than the stoichiometric ratio. In the normal injection mode in the normal region, A/F is virtually constant at a value that is slightly higher than the smoke generation region, to avoid the smoke generation region. In other words, to avoid this low A/F condition that generates smoke, smoke limit control, which limits the maximum injection quantity that can be injected with respect to the inlet air quantity, is executed. In the figure, there is a part of the premixed injection mode in the premixed region that passes through the smoke generation region, but in reality, the fuel is uniformly premixed for combustion, and coupled with the effect of the reentrant cavity described above, there is no problem with smoke generation. Each target value is set so that the variation in A/F is realized as described above.

When the engine load decreases during decelerating, and the changes are the opposite to those described above.

FIG. 9 shows the variation in injection quantity and injection timing when switching control modes. Here, FIG. 9(*a*) is the normal injection mode, (d) is the premixed injection mode, and (b), (c) show the transition states between these modes. As can be understood from the figure, in the premixed injection mode the main injection is executed only once, and in the normal injection mode, two injections are executed: the small quantity pilot injection and the large quantity main injection.

A characteristic here is that the injection quantity and injection timing of the main injection in the premixed injection mode (hereafter also referred to as the premixed main injection) and the injection quantity and injection timing of the pilot injection in the normal injection mode (hereafter also referred to as the normal pilot injection) are mutually related, and there is a transition between the two. In other words, for both the premixed main injection and the normal pilot injection the injection timing is before compression top dead center TDC, and their timing is comparatively close to each other. Therefore, the transition can be carried out smoothly by controlling in association with them, and this is desirable as it can be treated as a single value for control. In fact, in the present embodiment, the injection timing of the premixed main injection and the normal pilot injection are treated as a single or a common control parameter.

When switching from the normal injection mode to the premixed injection mode by going from FIG. 9(*a*) towards (*d*), the injection timing and the injection quantity of the normal pilot injection gradually change to those for the premixed main injection, and although the injection timing of the main injection in the normal injection mode (hereafter referred to as the normal main injection) is fixed to near the compression top dead center, the injection quantity gradually reduces, and ultimately becomes zero. Conversely, when switching from the premixed injection mode to the normal injection mode by going from FIG. 9(*d*) towards (*a*), the injection quantity and injection timing of the premixed main injection are gradually changed to those for the normal pilot injection, and the normal main injection which did not exist in the initial state gradually appears, the injection quantity gradually increases while the injection timing remains fixed at near the compression top dead center, and ultimately reaches the target value in the normal injection mode.

Regarding the relationship between the normal pilot injection and the premixed main injection, normally the injection quantity in the normal pilot injection is smaller than the injection quantity of the premixed main injection. Regarding the injection timing, in the example shown in the figure, the injection timing of the normal pilot injection is earlier than the injection timing of the premixed main injection, but later is also possible. Many forms of the normal pilot and main injections are possible, for example, the pilot injection may be executed immediately prior to the main injection, and the ignition created by the pilot injection can be continued by the combustion of the main injection fuel, or the pilot injection may be carried out comparatively early, the injected fuel is uniformly premixed, then the main injection is carried out, and so on. In the latter case, early pilot injection may be applied which the maximum heat generation rate is 60 kJ/s or less, as disclosed by the present applicants in Japanese Patent Application Laid-open No. 2003-148222.

Figure 14:
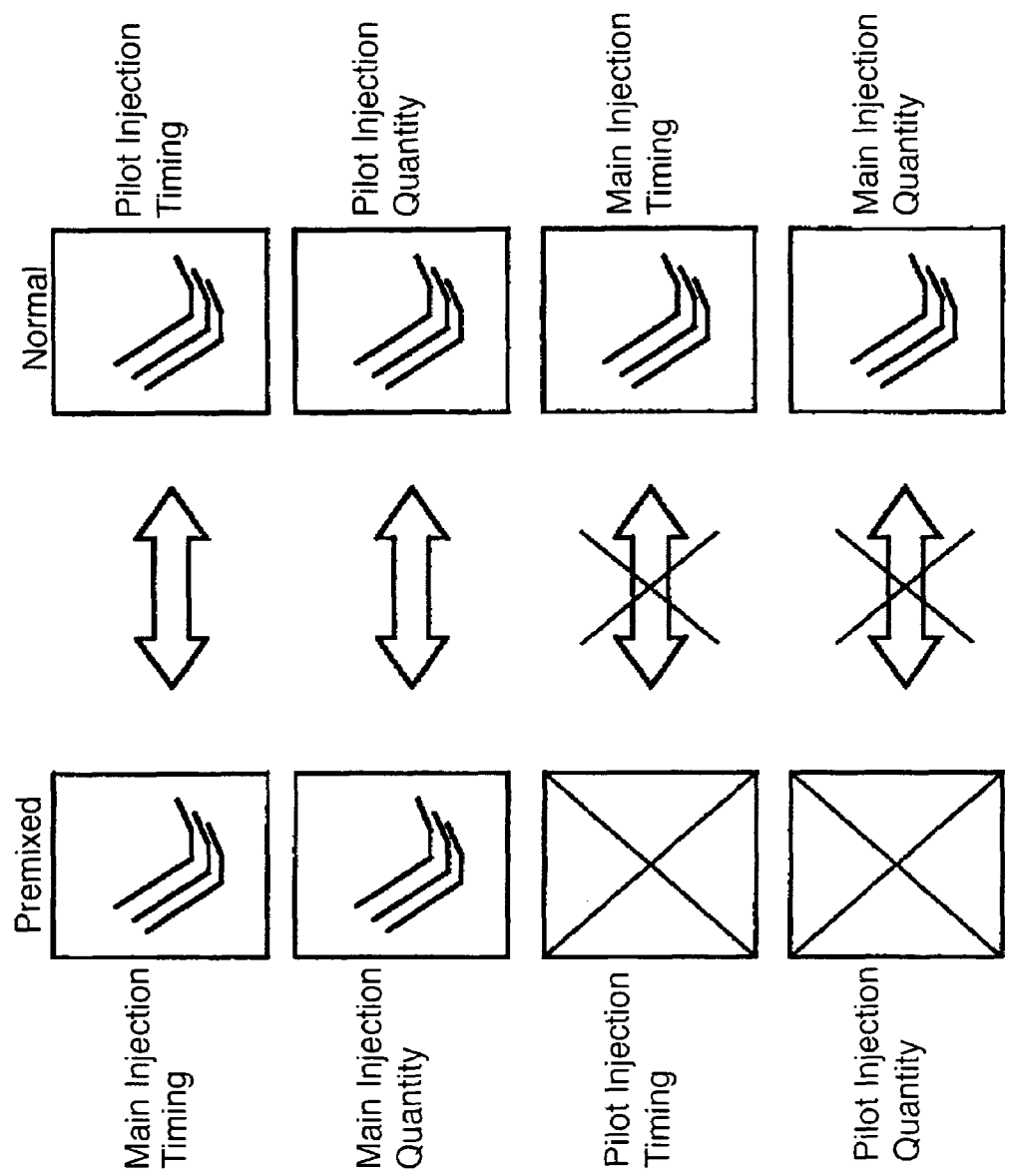
FIG. 14 is a diagram showing the relationship between maps for the case relating to the premixed main injection and the normal pilot injection.

If the premixed main injection and the normal pilot injection are related in this way, the relationship between maps shown in FIG. 6 is as shown in FIG. 14. In other words, the injection timing and injection quantity of the premixed main injection and the injection timing and injection quantity of the normal pilot injection are related respectively, and transition of target values between these is carried out. In contrast to this, there is no pilot injection in the premixed injection mode, so there is no injection timing and injection quantity calculation map. When the control mode is switched from the premixed injection mode to the normal injection mode, the target value of the injection timing is determined from a main injection timing calculation map of the normal injection mode corresponding to the engine operating conditions at that time. On the other hand, a provisional target value of the main injection quantity is determined from a main injection quantity calculation map of the normal injection mode corresponding to the engine operating conditions at that time, and the final target value is gradually approached to the provisional target value.

Figure 10:
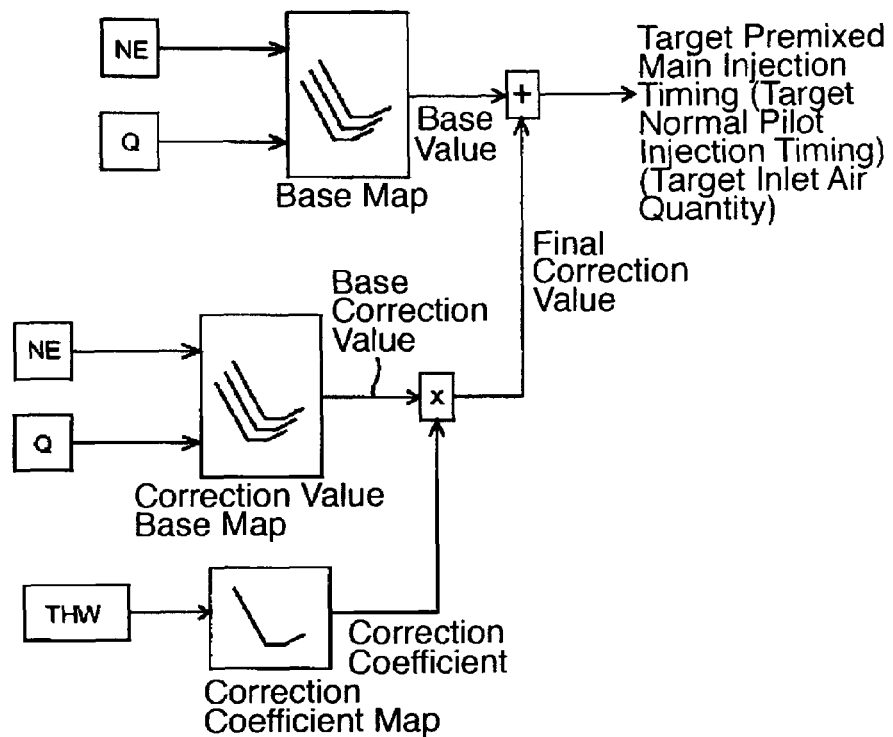
FIG. 10 is a diagram showing the logic for determining the target premixed main injection timing.

FIG. 10 shows the logic for determining the target injection timing of the premixed main injection. As stated before, in the present embodiment, the injection timing of both the premixed main injection and the normal pilot injection is treated as the same control parameter, so this logic can also be used to determine the target injection timing of the normal pilot injection. Also, in the present embodiment, the target inlet air quantity is determined using the same logic. This logic is executed by the ECU 26.

As shown in the figure, the base value of the target premixed main injection timing is first determined from the actual engine rotation speed NE and the target fuel injection quantity Q, using a base map. On the other hand, the base correction value is determined from the actual engine rotation speed NE and the target fuel injection quantity Q using a correction value base map. Then further, a correction coefficient is determined from the engine water temperature THW (this is a substitution value that of the engine temperature, oil temperature or the like may also be used) measured by a water temperature sensor (which is not shown in the drawings), using a correction coefficient map. This correction coefficient is multiplied by the base correction value to determine the final correction value, and by adding this final correction value to the base value of the target pilot injection timing, the final target premixed main injection timing is obtained. In other words, the target premixed main injection timing, the target normal pilot injection timing, and the target inlet air quantity are corrected based on the engine temperature by this logic.

When the engine has not completely warmed up, the temperature within the cylinder and the EGR gas cooling efficiency of the EGR cooler 22 are different from the temperature and efficiency after the engine has warmed up. Also, the EGR ratio and the oxygen concentration vary with the state of warming up of the engine. In particular, in premixed combustion, it is important to accurately control the oxygen concentration and EGR ratio (or the inlet air quantity) to the required values. This is the reason for the correction based on the engine temperature explained here.

It is preferable that this type of correction for the engine warm up condition and the EGR cooler condition (including deterioration and the like) is carried out based on detected values of the temperature and the oxygen concentration of the actual inlet air drawn into the cylinder.

Figure 11:
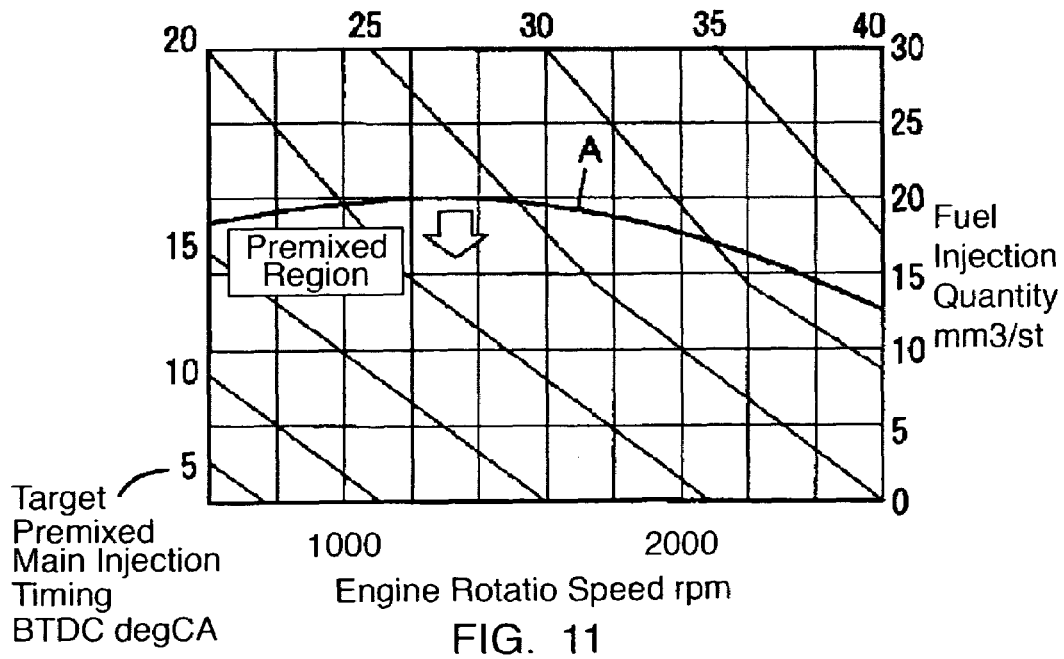
FIG. 11 is a diagram that shows more specifically a map for determining the target premixed main injection timing.

FIG. 11 shows more specifically a map for determining the target premixed main injection timing. The horizontal axis is the engine rotation speed (rpm), the vertical axis is the fuel injection quantity ($mm^3$/st), and only the low load side (lower side) of the mode switching values A is used. The mode switching values A referred to here are values intermediate between the mode switching values A1, A2. Also, in practice, the region above the fuel injection quantity corresponding to idling (in the present embodiment 5 $mm^3$/st) is used, as the fuel injection quantity does not become zero except when cutting off the fuel or similar. As can be understood from the figure, the premixed main fuel injection is set within the range 5 to 35° before top dead center, and as the engine rotation speed and fuel injection quantity (equivalent to the engine load) increase, the fuel injection timing tends to become earlier. Also, when the engine rotation speed is constant, the injection timing becomes earlier as the load increases. This is because as the injection quantity increases, it is necessary to increase the premixing period. On the other hand, when the fuel injection quantity is constant, the injection period becomes earlier as the rotation speed increases. This is because, as the rotation speed increases, the piston speed also increases, and to ensure the premixing period, it is necessary to start injection earlier.

Figure 12:
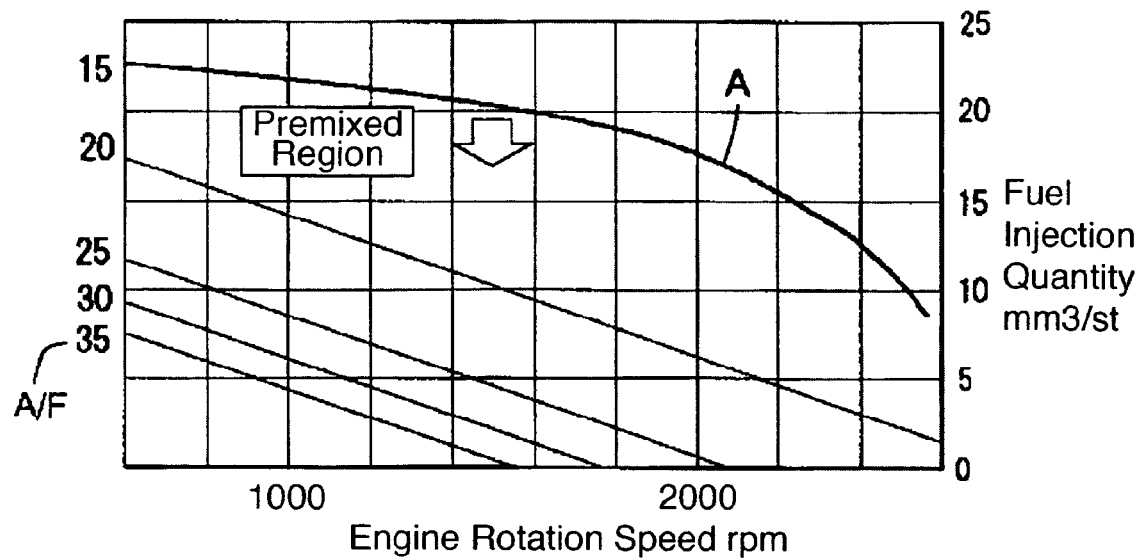
FIG. 12 shows the test results for actual A/F in the premixed region.

FIG. 12 shows the test results for actual A/F in the premixed region. The values of A/F shown here are values calculated from actual inlet air quantity, and are not directly measured values of A/F within the cylinder. As before, the horizontal axis is engine rotation speed (rpm), and the vertical axis is fuel injection quantity ($mm^3$/st), only the low load side (lower side) of the mode switching values A and the high load side (upper side) of the idling injection quantity are effective. At the position of the mode switching values A, A/F is about 15 which is the limit for premixed combustion, and the value becomes larger further down towards the low load side, indicating a tendency towards leanness. At the lowest load side, the maximum value exceeds 35.

In this way, according to the diesel engine control device of the present embodiment, switching between premixed combustion and diffuse combustion can be smoothly and properly carried out and changes in combustion noise or torque shocks can be prevented when switching.

When the engine is in the transition state, if switching occurs between premixed combustion and normal combustion, the transition or change of the actual values of the control parameters can be delayed when switching, which could cause the drivability to degrade or the like.

For example, in the present embodiment, the target EGR ratio in the premixed injection mode and the target EGR ratio in the normal injection mode differ greatly. The former is the large value of 50%, in contrast to which the latter is a general value of 30% or less (see FIG. 8). Also there is a difference in responsiveness as the actual values for the inlet gas system cannot be changed as fast as the actual values of the fuel system. Under these circumstances, if switching of a control mode occurs when accelerating or decelerating the engine, even though the switching point has been reached, the actual EGR ratio does not reach the value corresponding to the target value for the control mode after switching, so drivability could be degraded. In particular, in vehicle engines, during operation in the premixed injection mode of the premixed region, when the driver accelerates and the control mode switches to the normal injection mode, if the change in the actual values is delayed, the switch in control mode is in effect delayed, and sufficient acceleration performance cannot be obtained. In this way, this problem is particularly evident when accelerating the engine.

Therefore, to solve this problem, in the control device according to the present embodiment, forcible switching means is provided that forcibly switches the control mode to the other control mode if, when operating in one control mode corresponding to one operating region, the engine reaches a predetermined transition state. The following is a detailed explanation taking acceleration as an example in particular from among the transition states.

The change in target values and actual values for the gas inlet system explained in connection with FIG. 8 was an example in which the engine was steadily accelerated, in other words accelerated relatively gently. In contrast to this, when the engine is accelerated comparatively rapidly, the target values and actual values of the gas inlet system are changed in accordance with the control according to the present embodiment, as shown in FIG. 15. The parameters of the vertical axis and horizontal axis of FIG. 15 are the same as those of FIG. 8.

FIG. 15 shows the example in which the driver suddenly accelerates by pressing relatively suddenly on the accelerator pedal by a large amount when the control in the premixed injection mode is being implemented with the engine operating state in the premixed region. When it is determined that the engine is in a predetermined acceleration state by an acceleration determination that is described later (when the engine load=L1), even though the engine operating condition is in the premixed region, the control mode is switched to the normal injection mode. The control mode is switched before the engine operating conditions reach the original switching point B, so the problem of delay in the response of the inlet gas system described above is solved, so it is possible to smoothly and rapidly switch, the drivability may be improved, and the desired acceleration performance can be obtained.

In order to enable this type of anticipatory switching, target values of each control parameter for the normal injection mode are set in advance in the premixed region also. In the example shown in the figure, FIG. 15(a) shows the target value of inlet air quantity (in other words, the target value of the EGR ratio). In the opposite case, to achieve similar switching when suddenly decelerating, target values for the premixed injection mode are set also in advance in the normal region also.

In the premixed region, the target values of the inlet air quantity for the normal injection mode are obtained by extending the original line for the normal region into the premixed region. Therefore, the values become smaller towards the low load side. However, the values are higher than the target values for the premixed injection mode. The actual EGR ratio values shown in FIG. 15(b) and the actual A/F values shown in (c) become larger towards the low load side corresponding to this target value of inlet air quantity. The actual values of the EGR ratio are lower values than those for the premixed injection mode, and the actual values of the A/F ratio are higher values than those for the premixed injection mode.

As can be seen from the figure, when suddenly accelerating, the transition between modes for each value is sloped as shown by E2 accompanying the change in engine load when switching control modes. Also, as shown at E3 in FIG. 15(c), if switching is carried out after waiting until reaching the original switching point B, the change is carried out in a sloping manner, so immediately after switching to the normal injection mode, the A/F passes through a smoke generation region for a comparatively long time, so there is a problem with degradation of smoke. The more rapid the acceleration the more gentle the slope, as shown by E4, so the passage through the smoke generation region is longer, and smoke further degrades. According to the present embodiment, the control mode is switched before reaching the original switching point B as at E2, so in normal combustion, the A/F does not pass through the smoke generation region, and it is possible to avoid degradation of smoke.

Next, an ideal example of the forcible switching control is explained with reference to FIG. 16 to FIG. 18. FIG. 16 shows the case for sudden acceleration, FIG. 17 shows the case for medium to low acceleration, and FIG. 18 shows the case for gentle acceleration. The normal initial state is with the engine operating state in the premixed region, with fuel injection control implemented according to the premixed injection mode.

First the case of sudden acceleration as shown in FIG. 16 is explained. When the driver suddenly presses the accelerator pedal by a large amount, the target fuel injection quantity (equivalent to the engine load) comparatively suddenly increases by large amount. On the other hand, the rate of change (or the differential value) of the target fuel injection quantity, the rate of increase in the present embodiment, is constantly calculated by the ECU. This rate of increase is the value obtained by dividing the quantity of increase in the target fuel injection quantity in a unit of time by that unit of time. In terms of control, this control is executed at fixed crank angle periods or time periods, so the value is the value of the increase in the target fuel injection quantity in that crank angle period or time period divided by the crank angle period or time period. In the present embodiment, the value of the target fuel injection quantity is used as a substitute value for the engine load, but another value may be used, for example the accelerator degree of opening.

A threshold value of the rate of increase is set in advance and stored in the ECU. As shown in FIG. 16(c), in the present embodiment, two threshold values P1, P2 are set for the rate of increase: one for the increase side and one for the decrease side. The increase side threshold value P1 is a lower value than the decrease side threshold value P2. These threshold values are criteria when an acceleration determination is carried out.

The ECU compares the rate of increase with the increase side threshold value P1. Then if the rate of increase is greater than or equal to the increase side threshold value P1 (indicated by F in the figure), an acceleration flag is turned ON (see FIG. 16(d)). When the acceleration flag is turned ON, the control mode is switched to the normal injection mode. On the other hand, at this point of time F, as shown in FIG. 16(b), the target fuel injection quantity has not reached the high load side or acceleration side mode switching point A1. Therefore as shown in FIG. 16(e), the engine operating region is still in the premixed region. In this way, when the engine is in a predetermined acceleration state, the control mode is forcibly switched to the normal injection mode even though the operating conditions are in the premixed region.

Then, when the target fuel injection quantity reaches the high load side mode switching point A1 or higher (at the time G), the control mode is originally switched to the normal injection mode in accordance with the normal switching control. However, switching is already completed by the forcible switching control, so normal injection mode is maintained, and as a result, switching is executed earlier than the normal switching timing (the amount of advance is shown as $\Delta t5$). Therefore, it is possible to avoid the effect of the delay in the change of the actual values that accompanies the switching, in particular the delay in the change of the EGR ratio, so smooth and rapid switching can be achieved, and the desired drivability and acceleration performance can be obtained.

When forcibly switching, control to gradually change the target values and control to delay the start of changing the target values of the fuel system relative to the change of the target values of the inlet gas system is implemented, as explained in connection with FIG. 7.

As shown in FIG. 16 (c), in the present embodiment a rounding process is carried out on the rate of increase, and the value after this rounding process is compared with the threshold value P1 and the acceleration determination will be carried out. If this is not carried out, the acceleration flag is turned ON only at the instant that the driver presses the accelerator pedal, the control mode is switched for only an extremely short time, and the virtual effect cannot be obtained. After the rounding process, the rate of increase changes slowly, as can be seen from the figure, so the reduction in the rate of increase after having once risen can be suppressed. In this way, as will be understood later, the control mode can be maintained for a comparatively long period of time after forcible switching.

When the acceleration operation (pressing on the accelerator pedal) by the driver is completed, and the increase in the target fuel injection quantity is virtually zero, the value of the rate of increase reduces. This reduction is gentle as a result of the rounding process described above. Then at the point H, when the rate of increase reaches or is less than the reduction side threshold value P2, the acceleration flag is turned OFF. In this way the forcible switching control is terminated. At this point of time, the target fuel injection quantity has not reached the low load side or deceleration side mode switching point A2. Therefore, the engine operating condition is still in the normal region. In this case, the control mode is maintained in the normal injection mode in accordance with the normal switching control.

Next, the case of medium and low acceleration as shown in FIG. 17 is explained. In this case, the amount by which the accelerator pedal is pressed and the speed with which the accelerator pedal is pressed is small compared with the previous sudden acceleration case, and the value of target fuel injection quantity does not reach the high load side mode switching point A1. Therefore, the engine operating condition is in the premixed region, and control mode switching in accordance with the normal switching control is not carried out.

On the other hand, when the rate of increase of the target fuel injection quantity reaches the increase side threshold value P1 based on the driver's acceleration operation (F), the acceleration flag is turned ON, and the control mode is forcibly switched to the normal mode in accordance with the forcible switching control. Then when subsequently the acceleration operation by the driver is terminated, the value of the rate of increase of the target fuel injection quantity gradually decreases, and when the decrease side threshold value P2 or lower is reached (H), the acceleration flag is turned OFF, and the forcible switching control is terminated. When this occurs, the control mode is switched to the premixed injection mode, in accordance with the original normal switching control.

Next, the case of gentle acceleration as shown in FIG. 18 is explained. In this case, the amount by which the accelerator pedal is pressed by driver and the speed with which the accelerator pedal is pressed is small compared with the previous medium and low acceleration case, and not only does the value of target fuel injection quantity not reach the high load side mode switching point A1, but also the rate of increase of the target fuel injection quantity does not reach the increase side threshold value P1. Therefore, the acceleration flag is not turned ON, and forcible switching control is not carried out. As a result, the control mode is maintained in the pre mixed injection mode in accordance with the original normal switching control.

According to the control device of the present invention as described above, when the engine is accelerated, it is possible to switch the control mode earlier than the normal switching timing by the forcible switching control. Therefore it is possible to eliminate the effect of the delay in the change of the actual values of the inlet gas system in particular, and to ensure the desired drivability.

Also, early switching in this manner has the following advantages. As explained in connection with FIG. 8, smoke limiting control is carried out in the normal injection mode of the normal region to avoid the smoke generation region. On the other hand, in the smoke limiting control, when a smoke limit is set for the fuel injection quantity, when accelerating, it is necessary to delay the increase in the fuel injection quantity until the actual inlet air quantity has increased sufficiently (in a turbocharged engine, until the turbocharge pressure has risen sufficiently). In the A/F transition accompanying a normal switch at E5 as shown in FIG. 8, A/F passes through the smoke generation region immediately after switching. Therefore the increase in fuel injection quantity must be delayed immediately after switching at least until the inlet air quantity has increased sufficiently for A/F to pass through the smoke generation region, and as a result, the desired acceleration cannot be obtained. According to early switching in accordance with the present invention, as shown in FIG. 15, when accelerating, the inlet air quantity starts to increase before the mode switching point B is reached, so A/F also increases before the mode switching point B is reached as shown at E2, so the fuel injection quantity can be increased without being affected by the smoke limit, and the desired acceleration can be obtained.

On the other hand, during an actual vehicle running, the ECU cannot predict how much or for how long the driver will press the accelerator pedal. According to the early switching of the present invention, it is possible to switch the control mode at the instant that that the driver shows the intention to accelerate, so delay in acceleration is prevented, and the desired drivability can be obtained.

Furthermore, as explained in connection with FIG. 16 to FIG. 18, according to the control device of the present embodiment, the optimum mode selection can be carried out corresponding to the amount of acceleration.

The above explanation was carried out taking in particular the example of acceleration conditions from among the engine transition states, but the present invention may also be applied to the deceleration state. In this case, when implementing the normal injection mode in the normal region, when the engine reaches a predetermined deceleration state, the control mode is forcibly switched to the premixed injection mode. A person with ordinary skill in the art can easily apply the control as explained in connection with FIG. 15 to FIG. 16 to the deceleration state. For example, in FIG. 15, the direction of the arrow symbol is reversed, and in FIGS. 16 through 18, the value of the target fuel injection quantity decreases, and the rate of increase becomes a rate of decrease.

The embodiments of the present invention are not limited to the embodiment described above, and various other embodiments may be adopted. For example, in the embodiment described above, the total engine operating region is divided into the two regions, the normal region and the premixed region, however the total engine operating region may be divided into three or more regions that include different regions, and different control modes may be implemented for these different regions. Also, in the above embodiment, the inlet air quantity was used as a parameter related to the EGR ratio, but the value of EGR ratio may be directly used. In other words, the target EGR ratio itself is set in advance, and the actual EGR ratio is detected, and the actual EGR ratio is controlled so that it approaches the target EGR ratio. Also, in the normal injection mode, the pilot injection is not absolutely necessary, and the main injection alone may be used. Also conversely, a multi-stage injection in which the pilot injection is executed a plurality of times may be used.

While the present invention has been illustrated and described with respect to a particular embodiment thereof, it should be appreciated by those of ordinary skill in the art that various modifications to this invention may be made without departing from the spirit and scope of the present invention.

The invention claimed is:

1. A diesel engine control device that controls the injection quantity and injection timing of fuel injected into a cylinder of a diesel engine, wherein are provided two control modes of: a normal injection mode in which the injection quantity and injection timing are controlled so that the injected fuel ignites near compression top dead center during an injection period; and a premixed injection mode in which the injection quantity and injection timing are controlled so that fuel injection is completed before compression top dead center and the injected fuel ignites near compression top dead center after a premixing period, an entire engine operating region is divided into at least two regions, which are a normal region and a premixed region, the diesel engine control device comprising: normal switching means for switching the control mode so that target values of respective control parameters of the normal injection mode and the premixed injection mode are set in advance separately, the normal injection mode for controlling the control parameters based on the target value set for said normal injection mode is implemented when the actual engine operating conditions are in the normal region, and the premixed injection mode for controlling the control parameters based on the target value set for said premixed injection mode is implemented when the actual engine operating conditions are in the premixed region; and forcible switching means for setting the target values of the control parameters for the normal injection mode in advance in the premixed region and also for setting the target values of the control parameters for the premixed injection mode in advance in the normal region, said forcible switching means for forcibly switching the control mode to the normal injection mode for controlling the control parameters based on the target value for the normal injection mode set in advance in said premixed region when the engine enters a predetermined transition state while, in said premixed region, said premixed injection mode is being implemented and also for forcibly switching the control mode to the premixed injection mode for controlling the control parameters based on the target value for the premixed injection mode set in advance in said normal region when the engine enters the predetermined transition state while, in said normal region, said normal injection mode is being implemented.

2. The diesel engine control device according to claim 1, wherein when the premixed injection mode is being implemented in the premixed region, and when the engine enters a predetermined acceleration state, the forcible switching means forcibly switches the control mode to the normal injection mode.

3. The diesel engine control device according to claim 1, wherein the forcible switching means switches the control mode based on a comparison of a rate of change of an engine load with a predetermined threshold value.

4. The diesel engine control device according to claim 3, further comprising means for executing a rounding process with respect to the rate of change, wherein the forcible switching means switches the control mode based on a comparison of a value after the rounding process with the threshold value.

5. The diesel engine control device according to claim 3, wherein the rate of change is a rate of increase, two threshold values are provided on the increase side and the decrease side of the rate of increase, the forcible switching means starts the forcible switching when the rate of increase is equal to or greater than the increase side threshold value, and subsequently terminates the forcible switching when the rate of increase is equal to or less than the decrease side threshold value.

6. The diesel engine control device according to claim 5, wherein the increase side threshold value is set to a value lower than the decrease side threshold value.

7. The diesel engine control device according to claim 1, comprising an EGR device for recirculating a part of exhaust gas to the gas inlet side, and EGR control means for executing control so that the actual EGR ratio approaches the target EGR ratio as a target value, wherein the target EGR ratio of the premixed injection mode of the premixed region is set to 50% or greater.

8. The diesel engine control device according to claim 1, wherein when the control mode is switched, at least one of the normal switching means and the forcible switching means gradually changes the target values of one control mode into the target values of the other control mode.

9. The diesel engine control device according to claim 1, wherein when the control mode is switched, at least one of the normal switching means and the forcible switching means starts to change the target values of a fuel system behind the change in the target values of a gas inlet system.

10. The diesel engine control device according to claim 1, wherein, in the normal injection mode, a small quantity pilot injection and a large quantity main injection are carried out, and, in the premixed injection mode, only a main injection is carried out;

the target values comprise at least the target pilot injection quantity, the target pilot injection timing, the target main injection quantity, and the target main injection timing in the normal injection mode, as well as the target main injection quantity and the target main injection timing in the premixed injection mode;

the target pilot injection quantity and the target pilot injection timing in the normal injection mode are associated with the target main injection quantity and the target main injection timing in the premixed injection mode respectively; and when switching control modes, at least one of the normal switching means and the forcible switching means effects changes between the target pilot injection quantity in the normal injection mode and the target main injection quantity in the premixed injection mode, and effect changes between the target pilot injection timing in the normal injection mode and the target main injection timing in the premixed injection mode.

11. The diesel engine control device according to claim 1, wherein the engine comprises a reentrant type cavity provided in the top of a piston, and an injector whose injection angle is set so that the injected fuel enters the cavity in any of the control modes.

12. A diesel engine control device that controls the injection quantity and injection timing of fuel injected into a cylinder of a diesel engine, wherein are provided two control modes of: a normal injection mode in which the injection quantity and injection timing are controlled so that the injected fuel ignites near compression top dead center during an injection period; and a premixed injection mode in which the injection quantity and injection timing are controlled so that fuel injection is completed before compression top dead center and the injected fuel ignites near compression top dead center after a premixing period, an entire engine operating region is divided into at least two regions, which are a normal region and a premixed region, the diesel engine control device comprising: normal switching means for switching the control mode so that the normal injection mode is implemented when the actual engine operating conditions are in the normal region, and the premixed injection mode is implemented when the actual engine operating conditions are in the premixed region; and forcible switching means for forcibly switching one control mode to the other control mode when the engine enters a predetermined transition state while, in the one engine operating region, the one corresponding control mode is being implemented;

wherein the forcible switching means switches the control mode based on a comparison of a rate of change of an engine load with a predetermined threshold value.

13. The diesel engine control device according to claim 12, further comprising means for executing a rounding process with respect to the rate of change, wherein the forcible switching means switches the control mode based on a comparison of a value after the rounding process with the threshold value.

14. The diesel engine control device according to claim 12, wherein the rate of change is a rate of increase, two threshold values are provided on the increase side and the decrease side of the rate of increase, the forcible switching means starts the forcible switching when the rate of increase is equal to or greater than the increase side threshold value, and subsequently terminates the forcible switching when the rate of increase is equal to or less than the decrease side threshold value.

15. The diesel engine control device according to claim 14, wherein the increase side threshold value is set to a value lower than the decrease side threshold value.

* * * * *